(12) United States Patent
Furuzawa et al.

(10) Patent No.: US 11,505,137 B2
(45) Date of Patent: Nov. 22, 2022

(54) SOUND ABSORPTION MEMBER, VEHICLE COMPONENT, AND AUTOMOBILE

(71) Applicant: IBIDEN CO., LTD., Ogaki (JP)

(72) Inventors: Hideki Furuzawa, Ibi-gun (JP); Hiroshi Sakaguchi, Ibi-gun (JP); Tomohiro Nishikawa, Ibi-gun (JP); Toshihiro Nomura, Ibi-gun (JP)

(73) Assignee: IBIDEN CO., LTD., Ogaki (JP)

( * ) Notice: Subject to any disclaimer, the term of this patent is extended or adjusted under 35 U.S.C. 154(b) by 455 days.

(21) Appl. No.: 16/736,812

(22) Filed: Jan. 8, 2020

(65) Prior Publication Data

US 2020/0139902 A1    May 7, 2020

Related U.S. Application Data

(63) Continuation of application No. PCT/JP2017/027550, filed on Jul. 28, 2017.

(51) Int. Cl.
*E04B 1/82* (2006.01)
*B60R 13/08* (2006.01)
*G10K 11/168* (2006.01)
*G10K 11/172* (2006.01)

(52) U.S. Cl.
CPC ............ *B60R 13/08* (2013.01); *G10K 11/168* (2013.01); *G10K 11/172* (2013.01)

(58) Field of Classification Search
CPC ..... G10K 11/172; G10K 11/168; B60R 13/08
USPC ................................................. 181/290, 293
See application file for complete search history.

(56) References Cited

U.S. PATENT DOCUMENTS

| 7,677,359 B2 * | 3/2010 | Vigran ...................... E04B 1/86 181/293 |
| 2013/0118831 A1 * | 5/2013 | Kawai ................... E04B 1/8409 181/290 |

FOREIGN PATENT DOCUMENTS

| CN | 109263157 A | * 1/2019 | ............. B32B 3/266 |
| JP | 08-260589 | 10/1996 | |
| JP | 10-39875 | 2/1998 | |
| JP | 2001-249666 | 9/2001 | |
| JP | 2012-255967 | 12/2012 | |

* cited by examiner

*Primary Examiner* — Ammar T Hamid
(74) *Attorney, Agent, or Firm* — Mori & Ward, LLP

(57) ABSTRACT

A sound-absorbing member has a Helmholtz resonance structure including an inlet passage and a hollow portion connected to the outside through the inlet passage, wherein the sound-absorbing member includes a first layer and a second layer disposed on the first layer, the first layer includes a first main surface and a second main surface opposite to the first main surface, the second layer includes a third main surface facing the second main surface and a fourth main surface opposite to the third main surface, the first layer includes a first through-hole penetrating through the second main surface from the first main surface and defining the inlet passage, the second main surface includes a second main surface opening defining an end portion of the first through-hole and a second main surface flat portion, the third main surface includes a third main surface opening defining an end portion of the hollow portion and a third main surface flat portion, the second main surface opening has an opening area smaller than the opening area of the third main surface opening, and a first air layer is formed at least at a portion between the second main surface flat portion and the third main surface flat portion.

11 Claims, 6 Drawing Sheets

SOUND ABSORPTION MEMBER, VEHICLE COMPONENT, AND AUTOMOBILE

TECHNICAL FIELD

The present invention relates to a sound-absorbing member, a vehicle component, and an automobile.

BACKGROUND ART

Vehicles such as automobiles include power sources such as engines. Such vehicles are machines that can be moved by the user's operation, and generate various vibrations and noises. Sounds transferred to the interior of the vehicle include not only sounds generated by the power source but also sounds such as road noise, tire pattern noise, and wind noise generated outside of the vehicle during driving. These sounds transferred to the interior of the vehicle make people feel unpleasant, so that soundproofing measures are taken using a sound insulator and/or a sound-absorbing member in or around an engine, engine room, interior, body, exhaust pipe, or the like.

Along with an improvement in automobile technology, new soundproofing measures are required for automobiles. For example, one of the measures to improve the fuel economy of automobiles includes lowering the center of gravity and the minimum ground clearance of an automobile. Lowering the center of gravity of the automobile can improve the vehicle stability and operability, and lowering the minimum ground clearance can reduce the air resistance. Yet, lowering the minimum ground clearance of the automobile increases the viscosity of air flowing between the vehicle and the ground during driving. In such a case, presumably, noise generated from the ground during driving, such as tire pattern noise (noise in the frequency range of 500 to 3000 Hz, also simply referred to as "pattern noise"), is less likely to reflect or diffuse around the area below the vehicle body, increasing the level of sound that enters the vehicle interior. Similar problems can also occur in the case of electric vehicles.

Thus, when the center of gravity and the minimum ground clearance of an automobile are lowered to improve the fuel economy of the automobile, noise that conventionally diffused to the outside of the automobile may be transferred to the driver and/or passenger(s) in the automobile. In particular, these noises are considered to easily enter from the bottom of a lower portion of the luggage compartment (underfloor space) in the back of the vehicle where the accommodation space is arranged. These noises include a noise in a frequency range of 500 to 2000 Hz which makes people feel unpleasant. Thus, a countermeasure is required.

Patent Literature 1 discloses a sound-absorbing member including multiple resonance chambers in flexible porous foam obtained by foam molding, wherein each resonance chamber includes an inlet passage that opens to one side of the flexible porous foam and a hollow portion formed in the back of the inlet passage and having a cross-sectional area larger than that of the inlet passage.

Patent Literature 2 discloses a sound absorption and insulation structure including a sound-absorbing member and a resin molded article having multiple independent blind cavities each having an opening in the front or back surface of the resin molded article, wherein the sound absorption and insulation structure has a specific resonant sound absorption peak frequency in the range of 100 Hz to 10 kHz.

CITATION LIST

Patent Literature

Patent Literature 1: JP H08-260589 A
Patent Literature 2: JP 2001-249666 A

SUMMARY OF INVENTION

Technical Problem

The sound-absorbing member disclosed in Patent Literature 1 and the resin molded article disclosed in Patent Literature 2 each include a pore called Helmholtz resonance structure.

The Helmholtz resonance structure includes an inlet passage that opens to the surface and a hollow portion connected to the outside through the inlet passage.

When a sound reaches the inlet passage of the Helmholtz resonance structure, air in the inlet passage is pushed by the sound and attempts to enter the hollow portion.

Here, since air is elastic, the air in the hollow portion attempts to push out the air in the inlet passage. In other words, the air in the hollow portion functions as a spring.

In this case, the movement of the air in the inlet passage can be represented as a simple vibration movement. At this frequency, the sound that has reached the inlet passage is cancelled out by resonance, i.e., the sound is absorbed.

As described, the Helmholtz resonance structure can absorb sound having a predetermined frequency. Yet, the sound absorption frequency depends on the volume of the hollow portion and the length and the opening area of the inlet passage.

Thus, the sound absorption frequency can be adjusted by adjusting the volume of the hollow portion and the length and the opening area of the inlet passage.

There is a demand to improve the sound absorption coefficient of a sound-absorbing member.

In particular, for vehicle use, there is a demand to develop a sound-absorbing member having a size equivalent to or smaller than the conventional size because the accommodation space is limited and having a high sound absorption coefficient.

The present invention was achieved to solve the problems described above, and aims to provide a sound-absorbing member having a sufficiently high sound absorption coefficient.

Solution to Problem

The sound-absorbing member of the present invention is a sound-absorbing member having a Helmholtz resonance structure including an inlet passage and a hollow portion connected to the outside through the inlet passage, wherein the sound-absorbing member includes a first layer and a second layer disposed on the first layer, the first layer includes a first main surface and a second main surface opposite to the first main surface, the second layer includes a third main surface facing the second main surface and a fourth main surface opposite to the third main surface, the first layer includes a first through-hole penetrating through the second main surface from the first main surface and defining the inlet passage, the second main surface includes a second main surface opening defining an end portion of the first through-hole and a second main surface flat portion, the third main surface includes a third main surface opening defining an end portion of the hollow portion and a third main surface flat portion, the second main surface opening has an opening area smaller than the opening area of the third main surface opening, and a first air layer is formed at least at a portion between the second main surface flat portion and the third main surface flat portion.

The sound-absorbing member of the present invention is a sound-absorbing member having a Helmholtz resonance structure in which the first layer including the inlet passage and the second layer including the hollow portion are stacked. Thus, the sound-absorbing member can efficiently absorb sound having a predetermined frequency.

Further, in the sound-absorbing member of the present invention, the first air layer is formed at least at a portion between the second main surface flat portion of the first layer and the third main surface flat portion of the second layer. The sound-absorbing member having such a structure has a higher sound absorption coefficient.

In the sound-absorbing member of the present invention, the second main surface flat portion and the third main surface flat portion may be partially in contact with each other.

Even when the second main surface flat portion and the third main surface flat portion are partially in contact with each other, the sound absorption coefficient increases as long as the first air layer is formed at a portion between the second main surface flat portion and the third main surface flat portion.

At least one of the second main surface flat portion or the third main surface flat portion may be curved or wavy, and the second main surface flat portion and the third main surface flat portion may be partially in contact with each other.

The first air layer can be formed because at least one of the second main surface flat portion or the third main surface flat portion is curved or wavy, and the sound absorption coefficient thus can be increased.

In the sound-absorbing member of the present invention, the hollow portion may have a bottom in the second layer.

In the sound-absorbing member having such a structure, the second layer includes a blind hole defining the hollow portion.

The sound-absorbing member having such a structure can be produced by stacking the first layer and the second layer.

The sound-absorbing member of the present invention may have a configuration in which a third layer including a fifth main surface facing the fourth main surface and a sixth main surface opposite to the fifth main surface is disposed below the second layer, the second layer includes a second through-hole penetrating through the fourth main surface from the third main surface and defining a lateral side of the hollow portion, and the fifth main surface defines a bottom of the hollow portion.

The sound-absorbing member can be more efficiently produced when the hollow portion is formed by forming a through-hole that defines the lateral side of the hollow portion in a first layer and stacking a second layer that defines the bottom of the hollow portion below the first layer than when the hollow portion is formed by forming a blind hole in one layer.

In other words, the sound-absorbing member having such a structure has a high production efficiency.

In the sound-absorbing member of the present invention, preferably, the fourth main surface includes a fourth main surface opening defining an end portion of the second through-hole and a fourth main surface flat portion, and a second air layer is formed at least at a portion between the fourth main surface flat portion and the fifth main surface.

The sound absorption efficiency further increases when the second air layer is present in addition to the first air layer at least at a portion between the fourth main surface flat portion of the second layer and the fifth main surface of the third layer.

In the sound-absorbing member of the present invention, the fourth main surface flat portion and the fifth main surface may be partially in contact with each other.

Even when the fourth main surface flat portion and the fifth main surface are partially in contact with each other, the sound absorption coefficient increases as long the second air layer is formed at a portion between the fourth main surface flat portion and the fifth main surface.

At least one of the fourth main surface flat portion or the fifth main surface may be curved or wavy, and the fourth main surface flat portion and the fifth main surface may be partially in contact with each other.

The second air layer can be formed because at least one of the fourth main surface flat portion or the fifth main surface is curved or wavy, and the sound absorption coefficient thus can be increased.

In the sound-absorbing member of the present invention, preferably, the first main surface includes a first main surface opening defining an end portion of the first through-hole and a first main surface flat portion, and a fiber layer is disposed on the first main surface flat portion.

The sound-absorbing member having a Helmholtz resonance structure can absorb sound in a predetermined frequency range, but the frequency range that can be absorbed is narrow, and particularly, sound in a high frequency range of 2000 Hz and above cannot be sufficiently absorbed.

Yet, when the fiber layer is formed, the sound-absorbing member can absorb sound in a high frequency range of 2000 Hz and above.

The sound-absorbing member of the present invention is preferably made of resin and/or a fibrous material. The resin is preferably a foamed resin or elastomer such as rubber.

The sound-absorbing member made of resin is particularly preferred as a vehicle component because the weight reduction can be easily achieved.

When the resin is a foamed resin, the weight can be further reduced, and the resulting sound-absorbing member used as a vehicle component can contribute to better fuel economy.

In the present invention, the sound-absorbing member may be a composite material of resin and fibers. A composite material may be obtained by mixing resin and fibers. The resin and fibers may be combined in blocks, or the resin and fibers in the form of sheets may be stacked.

The vehicle component of the present invention includes the sound-absorbing member of the present invention.

The sound-absorbing member of the present invention has excellent sound absorption performance, and is thus excellent as a vehicle component.

Examples of the vehicle component including the sound-absorbing member of the present invention include floor level raising materials, partition members, and luggage boxes.

The automobile of the present invention includes the sound-absorbing member of the present invention with the inlet passage oriented facing a road.

The sound-absorbing member of the present invention disposed in such an orientation can absorb tire pattern noise transferred from the road, and prevent transfer of noise to the vehicle interior.

DESCRIPTION OF EMBODIMENTS

Figure 1:
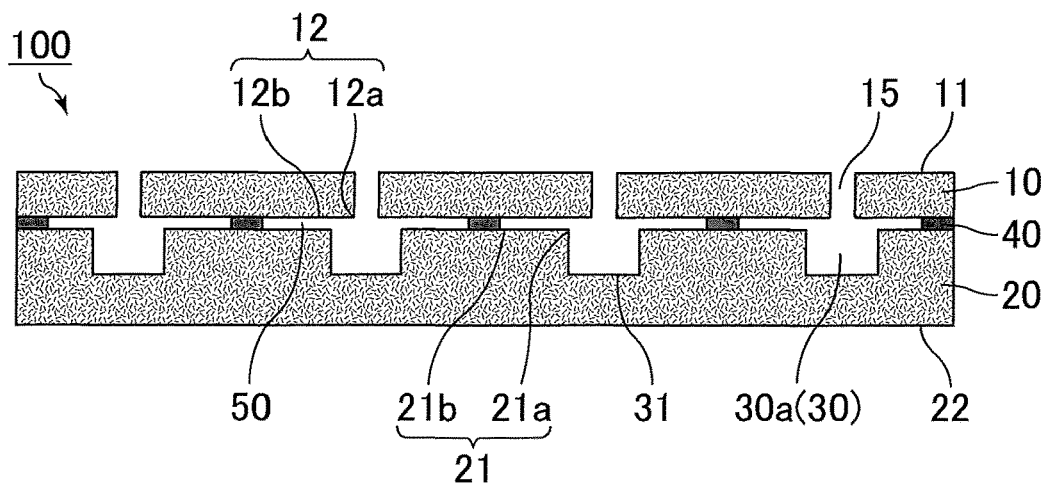
FIG. 1 is a schematic cross-sectional view of an exemplary sound-absorbing member of the present invention.

The present invention is specifically described below. The present invention is not limited to the following description, and any suitable changes may be made without departing from the gist of the present invention.

The sound-absorbing member of the present invention is a sound-absorbing member having a Helmholtz resonance structure including an inlet passage and a hollow portion connected to the outside through the inlet passage, wherein the sound-absorbing member includes a first layer and a second layer disposed on the first layer, the first layer includes a first main surface and a second main surface opposite to the first main surface, the second layer includes a third main surface facing the second main surface and a fourth main surface opposite to the third main surface, the first layer includes a first through-hole penetrating through the second main surface from the first main surface and defining the inlet passage, the second main surface includes a second main surface opening defining an end portion of the first through-hole and a second main surface flat portion, the third main surface includes a third main surface opening defining an end portion of the hollow portion and a third main surface flat portion, the second main surface opening has an opening area smaller than the opening area of the third main surface opening, and a first air layer is formed at least at a portion between the second main surface flat portion and the third main surface flat portion.

The sound-absorbing member of the present invention is a sound-absorbing member in which the first layer including the inlet passage and the second layer including the hollow portion are stacked and has a Helmholtz resonance structure. Thus, the sound-absorbing member can efficiently absorb sound having a predetermined frequency.

Further, in the sound-absorbing member of the present invention, the first air layer is formed at least at a portion between the second main surface flat portion of the first layer and the third main surface flat portion of the second layer. The sound-absorbing member having such a structure has a higher sound absorption coefficient.

In the sound-absorbing member of the present invention, the first air layer may or may not be connected to the hollow portion. Yet, it is more preferred when the first air layer is connected to the hollow portion.

The sound absorption coefficient increases when the first air layer is connected to the hollow portion.

In the sound-absorbing member of the present invention, the second main surface flat portion and the third main surface flat portion may be partially in contact with each other.

Even when the second main surface flat portion and the third main surface flat portion are partially in contact with each other, the sound absorption coefficient increases as long as the first air layer is formed at a portion between the second main surface flat portion and the third main surface flat portion.

In the sound-absorbing member of the present invention, a spacer may or may not be provided between the second main surface flat portion and the third main surface flat portion to form the first air layer.

The spacer makes it possible to reliably form the first air layer in the sound-absorbing member of the present invention.

When no spacer is provided, it is advantageous in that the spring-mass effect is not diminished by the spacer.

The entire thickness of the sound-absorbing member of the present invention is preferably 10 to 120 mm. The thickness of the sound-absorbing member is more preferably 20 to 100 mm.

When the thickness of the sound-absorbing member is less than 10 mm, the Helmholtz resonance structure is difficult to form.

When the thickness of the sound-absorbing member is more than 120 mm, the sound-absorbing member is too big to be easily disposed in a desired space.

As described above, in the sound-absorbing member of the present invention, the equivalent circle diameter of the opening of the inlet passage (first through-hole) is preferably 1 to 30 mm, more preferably 3 to 25 mm.

The length of the inlet passage (first through-hole) is preferably 1 to 20 mm, more preferably 3 to 15 mm.

The volume of the hollow portion is preferably 24 to 329,860 mm$^3$, more preferably 257 to 246,766 mm$^3$.

In the sound-absorbing member of the present invention, the sound-absorbing member may include two layers including the first layer and the second layer, or may include three layers including the first layer, the second layer, and the third layer.

The following separately describes a case where the sound-absorbing member includes two layers and a case where the sound-absorbing member includes three layers.

First, a case where the sound-absorbing member includes two layers is described.

In this case, in the sound-absorbing member of the present invention, the hollow portion has a bottom in the second layer.

In other words, in the sound-absorbing member of the present invention, the second layer includes a blind hole defining a hollow portion.

Such a structure enables production of the sound-absorbing member of the present invention having a Helmholtz resonance structure by stacking the first layer and the second layer.

The first layer and the second layer may be stacked in any manner as long as the first air layer is formed between the second main surface flat portion of the first layer and the third main surface flat portion of the second layer.

For example, an adhesive layer may be formed at a portion between the second main surface flat portion and the third main surface flat portion to stack the first layer and the second layer. Here, the first layer and the second layer may be adhered to each other only at the end portions of the first layer and the second layer.

Alternatively, engaging portions (a male member and a female member) may be formed on the second main surface flat portion and the third main surface flat portion such that the male member is engaged with the female member, whereby the first layer and the second layer are stacked.

In the sound-absorbing member of the present invention, the first through-hole is preferably cylindrical, and the cross-sectional shape in a direction perpendicular to the longitudinal direction is preferably a true circle. When the first through-hole is cylindrical, the inlet passage is cylindrical. The inlet passage having a cylindrical shape is advantageous because sound absorption characteristics without anisotropy are achieved.

In the sound-absorbing member of the present invention, when the first through-hole is cylindrical, the diameter of the bottom is preferably 1 to 30 mm.

In other words, in the sound-absorbing member of the present invention, the inlet passage preferably has an inner diameter of 1 to 30 mm.

When the shape of the first through-hole is not cylindrical, the diameter of the first through-hole is defined as the equivalent circle diameter. The equivalent circle diameter is the diameter of a true circle having the same area as that of a cross-sectional area of the first through-hole obtained by cutting the first through-hole in a direction perpendicular to the longitudinal direction. When the cross-sectional shape of the first through-hole is a true circle, the diameter can be directly defined as the equivalent circle diameter.

In the sound-absorbing member of the present invention, the first through-holes in the first layer may be arranged in a square pattern in which squares are continuously arranged in longitudinal and transverse directions and the first through-holes are arranged at the corners of the squares in a plan view. Alternatively, the first through-holes may be arranged in a zigzag pattern in which equilateral triangles are continuously arranged in longitudinal and transverse directions and the first through-holes are arranged at the corners of the triangles in a plan view.

Of these, the zigzag pattern is preferred. When the first through-holes are arranged in the zigzag pattern, all the adjacent first through-holes tend to have the same interval, which improves the sound absorption effect. The zigzag pattern also provides strength to the first layer in the form of a board.

In the sound-absorbing member of the present invention, the board defining the first layer is preferably made of resin.

The resin is preferably a foamed resin or elastomer such a rubber.

The sound-absorbing member in which the board defining the first layer is made of resin is particularly preferred as a vehicle component because the weight reduction can be easily achieved.

When the resin is a foamed resin, the weight can be further reduced, and the resulting sound-absorbing member used as a vehicle component can contribute to better fuel economy.

In the sound-absorbing member of the present invention, the sheet defining the first layer may be a composite material of resin and fibers. A composite material may be obtained by mixing resin and fibers. The resin and fibers may be combined in blocks or the resin and fibers in the form of boards may be stacked.

The resin is preferably a foamed resin formed from foamable resin particles (beads), a foamed resin containing air bubbles, a thermoplastic resin, or a thermosetting resin.

The density of the resin is preferably 0.01 to 1 $g/cm^3$, more preferably 0.02 to 0.1 $g/cm^3$. When the resin is a foamed resin, the density of the resin is the density of the foamed resin obtained by foam molding.

When the density of the resin is in the above range, the resulting sound-absorbing member can easily achieve required strength.

When the density of the resin is less than 0.01 $g/cm^3$, the resulting sound-absorbing member may not achieve sufficient mechanical strength. When the density of the resin is more than 1 $g/cm^3$, the resulting sound-absorbing member has an increased weight, which interferes with vehicle weight reduction.

The resin is more preferably a foamed resin formed from foamable resin particles (beads). When the resin is a foamed resin formed from foamable resin particles (beads), the resulting sound-absorbing member can have a lighter weight while its strength is maintained. Such a sound-absorbing member when used in a vehicle component can contribute to better fuel economy.

The foamed resin is obtained by foam molding foamable resin particles.

In the sound-absorbing member of the present invention, foamable resin particles (beads) used to form the board defining the first layer are particles containing a blowing agent inside each resin particle, and any known foamable resin particles can be suitably used.

Examples of a resin component of the foamable resin particles include olefin resins such as polyethylene and polypropylene, and styrene resins such as polystyrene.

Examples of the styrene resins include styrene homopolymer and copolymers obtainable by copolymerization of styrene and a monomer copolymerizable with styrene (or its derivative). The styrene copolymer may be any of a block copolymer, a random copolymer, or a graft copolymer.

Examples of the blowing agent include hydrocarbons such as propane, butane, and pentane.

In the sound-absorbing member of the present invention, if necessary, a known additive may be added to the foamable resin particles used to form the board defining the first layer. Examples of such known additive include flame retardants, flame retardant aids, processing aids, fillers, antioxidants, light-resistant stabilizers, antistatic agents, and colorants. As an example of use of an additive, a black colorant may be used so as to make stain less noticeable.

Examples of the flame retardant include hydrated metal flame retardants such as aluminum hydroxide and magnesium hydroxide; phosphate flame retardants such as red phosphorus and ammonium phosphate; halogen flame retardants such as tetrabromobisphenol A (TABB), brominated polystyrene, and chlorinated paraffin; and nitrogen flame retardants such as ammonium carbonate and melamine cyanurate.

Examples of the flame retardant aid include antimony trioxide and antimony pentoxide.

Examples of the processing aid include stearate, liquid paraffin, olefin wax, stearylamide compounds, and epoxy compounds.

Examples of the filler include silica, talc, and calcium silicate.

Examples of the antioxidant include alkylphenol, alkylene bisphenol, alkylphenol thioether, $\beta,\beta$-thiopropionate, organic phosphite, and phenol-nickel composite.

Examples of the light-resistant stabilizer include benzotriazole ultraviolet absorbers and hindered amine stabilizers.

Examples of the antistatic agent include low molecular antistatic agents such as fatty acid ester compounds, aliphatic ethanolamine compounds, and aliphatic ethanolamide compounds, and high molecular antistatic agents.

Examples of the colorant include dyes and pigments.

In the sound-absorbing member of the present invention, the average particle size of the foamable resin particles used to form the board defining the first layer is preferably 300 μm to 2400 μm, more preferably 800 μm to 2000 μm.

The expansion ratio of the foamable resin particles is preferably 10 to 60 times.

When the expansion ratio is in the range of 10 times to 60 times, the density of the resin can be easily adjusted within the range of 0.02 to 0.1 g/cm$^3$.

When the expansion ratio is less than 10 times, the sound-absorbing member may be too hard or too heavy. When the expansion ratio is more than 60 times, the sound-absorbing member may have insufficient strength.

In the sound-absorbing member of the present invention, the foamed resin used as the board defining the first layer may be polyurethane or the like. Polyurethane as a main component is mixed with a blowing agent or the like to be foamed and molded to obtain a foamed resin containing air bubbles, whereby a board can be produced.

In the sound-absorbing member of the present invention, the resin used as the board defining the first layer may be a thermoplastic resin or a thermosetting resin.

In the sound-absorbing member of the present invention, the thermoplastic resin used as the board defining the first layer may be a polypropylene resin, a polyethylene resin, a polyester resin (such as nylon 6,6), a polystyrene resin, or the like. The sound-absorbing member can be produced by molding a thermoplastic resin into resin pellets, heating the resin pellets, and molding the resin pellets by injection molding, extrusion, or the like.

In the sound-absorbing member of the present invention, the thermosetting resin used as the board defining the first layer may be an epoxy resin, a phenolic resin, a melamine resin, a urea resin, polyurethane, polyurea, polyamide, poly- acrylamide, or the like. The sound-absorbing member can be produced by pre-heating a thermosetting resin, placing the thermosetting resin in a mold, pressurizing, and increasing the mold temperature to cure the thermosetting resin.

In the sound-absorbing member of the present invention, the sheet defining the first layer may be made of an inorganic material, a metal material, or the like, besides resin.

In the sound-absorbing member of the present invention, the thickness of the board defining the first layer is preferably 1 to 20 mm. The thickness of the board is the length of the first through-hole, which is the length of the inlet passage. In other words, the length of the first through-hole is preferably 1 to 20 mm. The length of the inlet passage is also preferably 1 to 20 mm.

In the sound-absorbing member of the present invention, the first main surface includes a first main surface opening defining an end portion of the first through-hole and a first main surface flat portion. Preferably, a fiber layer is disposed on the first main surface flat portion.

The sound-absorbing member having a Helmholtz resonance structure can absorb sound in a predetermined frequency range, but the frequency range that can be absorbed is narrow, and particularly, sound in a high frequency range of 2000 Hz and above cannot be sufficiently absorbed.

Yet, when the fiber layer is formed, the sound-absorbing member can absorb sound in a high frequency range of 2000 Hz and above.

A material of the fiber layer is preferably selected from natural fibers, synthetic resin fibers, or inorganic fibers. Examples of the natural fibers include plant fibers, animal fibers, and mineral fibers. Examples of the synthetic resin fibers include polyamide resins (e.g., nylon), polyester resins (e.g., polyethylene terephthalate (PET) and polyethylene naphthalate (PEN)), acrylic resins, polyvinyl alcohol resins, and polyolefin resins (e.g., polyethylene and polypropylene). Examples of the inorganic fibers include alumina fibers, silica fibers, silica-alumina fibers, glass fibers, carbon fibers, potassium titanate fibers, and rock wool.

The fiber layer may be provided in the form of felt or a non-woven fabric.

The thickness of the fiber layer is preferably 1 to 20 mm.

Since spaces are formed between fibers in the fiber layer, air vibrates in the spaces, enabling absorption of sound in a high frequency range.

The first main surface flat portion and the fiber layer may or may not be adhered to each other by an adhesive layer.

The second layer is a board having a blind hole, and is disposed on the first layer.

When the blind hole in the second layer is connected to the first through-hole in the first layer (i.e., the inlet passage), the blind hole is connected to the outside, whereby a Helmholtz resonance structure is formed.

In the sound-absorbing member of the present invention, the shape of the blind hole in the second layer is preferably cylindrical, and the cross-sectional shape in a direction perpendicular to the longitudinal direction is preferably a true circle.

In the sound-absorbing member of the present invention, when the blind hole in the second layer is cylindrical, the height is preferably 1 to 20 mm, more preferably 3 to 15 mm.

When the shape of the blind hole is not cylindrical, the diameter of the blind hole is defined as the equivalent circle diameter. The equivalent circle diameter is the diameter of a true circle having the same area as that of a cross-sectional area of the blind hole obtained by cutting the blind hole in a direction perpendicular to the longitudinal direction. When the cross-sectional shape of the blind hole is a true circle, the diameter can be directly defined as the equivalent circle diameter.

In the sound-absorbing member of the present invention, the blind holes in the second layer may be arranged in a square pattern in which squares are continuously arranged in longitudinal and transverse directions and the blind holes are arranged at the corners of the squares in a plan view. Alternatively, the blind holes may be arranged in a zigzag pattern in which equilateral triangles are continuously arranged in longitudinal and transverse directions and the blind holes are arranged at the corners of the triangles in a plan view.

Of these, the zigzag pattern is preferred. When the blind holes are arranged in the zigzag pattern, all the adjacent blind holes tend to have the same interval, which improves the sound absorption effect. The zigzag pattern also provides strength to the second layer in the form of a board.

In the sound-absorbing member of the present invention, the positional relationship between the inlet passage and the blind hole is not limited as long as the blind hole is connected to the outside through the inlet passage. The center of the inlet passage and the center of the blind hole (center of the cross-sectional shape obtained by cutting in a direction perpendicular to the thickness direction) may or may not be coincident with each other.

The blind hole in the second layer is preferably formed by machine processing on a board. Cutting with an end mill or cutting with hot wire is preferred.

Alternatively, a board integrally molded with a blind hole by injection molding or press molding may be produced.

When a foamed resin formed from foamable resin particles (beads) is used as the board, the board including a blind hole can also be produced by foam molding in a mold including a protrusion corresponding to the shape of the blind hole.

The board defining the second layer is preferably made of resin and/or a fibrous material. The resin is preferably a foamed resin or elastomer such as rubber.

The sound-absorbing member in which the board defining the second layer is made of resin is particularly preferred as a vehicle component because the weight reduction can be easily achieved.

When the resin is a foamed resin, the weight can be further reduced, and the resulting sound-absorbing member used as a vehicle component can contribute to better fuel economy.

The board defining the second layer may be a composite material of resin and fibers. A composite material may be obtained by mixing resin and fibers. The resin and fibers may be combined in blocks or the resin and fibers in the form of boards may be stacked.

The resin is preferably a foamed resin formed from foamable resin particles (beads), a foamed resin containing air bubbles, a thermoplastic resin, or a thermosetting resin.

The density of the resin is preferably 0.01 to 1 $g/cm^3$, more preferably 0.02 to 0.1 $g/cm^3$. When the resin is a foamed resin, the density of the resin is the density of the foamed resin obtained by foam molding.

When the density of the resin is in the above range, the resulting sound-absorbing member can easily achieve required strength.

When the density of the resin is less than 0.01 $g/cm^3$, the resulting sound-absorbing member may not achieve sufficient mechanical strength. When the density of the resin is more than 1 $g/cm^3$, the resulting sound-absorbing member has an increased weight, which interferes with vehicle weight reduction.

The resin is more preferably a foamed resin formed from foamable resin particles (beads). When the resin is a foamed resin formed from foamable resin particles (beads), the resulting sound-absorbing member can have a lighter weight while its strength is maintained. Such a sound-absorbing member when used in a vehicle component can contribute to better fuel economy.

The foamed resin is obtained by foam molding foamable resin particles.

The board formed from the foamed resin formed from foamable resin particles (beads) does not include continuous pores.

In the sound-absorbing member of the present invention, foamable resin particles (beads) used to form the board defining the second layer are particles containing a blowing agent inside each resin particle, and any known foamable resin particles can be suitably used.

Examples of a resin component of the foamable resin particles include olefin resins such as polyethylene and polypropylene, and styrene resins such as polystyrene.

Examples of the styrene resins include styrene homopolymer and copolymers obtainable by copolymerization of styrene and a monomer copolymerizable with styrene (or its derivative). The styrene copolymer may be any of a block copolymer, a random copolymer, or a graft copolymer.

Examples of the blowing agent include hydrocarbons such as propane, butane, and pentane.

In the sound-absorbing member of the present invention, if necessary, a known additive may be added to the foamable resin particles used to form the board defining the second layer. Examples of such known additive include flame retardants, flame retardant aids, processing aids, fillers, antioxidants, light-resistant stabilizers, antistatic agents, and colorants. As an example of use of an additive, a black colorant may be used so as to make stain less noticeable.

Examples of the flame retardant include hydrated metal flame retardants such as aluminum hydroxide and magnesium hydroxide; phosphate flame retardants such as red phosphorus and ammonium phosphate; halogen flame retardants such as tetrabromobisphenol A (TABB), brominated polystyrene, and chlorinated paraffin; and nitrogen flame retardants such as ammonium carbonate and melamine cyanurate.

Examples of the flame retardant aid include antimony trioxide and antimony pentoxide.

Examples of the processing aid include stearate, liquid paraffin, olefin wax, stearylamide compounds, and epoxy compounds.

Examples of the filler include silica, talc, and calcium silicate.

Examples of the antioxidant include alkylphenol, alkylene bisphenol, alkylphenol thioether, $\beta,\beta$-thiopropionate, organic phosphite, and phenol-nickel composite.

Examples of the light-resistant stabilizer include benzotriazole ultraviolet absorbers and hindered amine stabilizers.

Examples of the antistatic agent include low molecular antistatic agents such as fatty acid ester compounds, aliphatic ethanolamine compounds, and aliphatic ethanolamide compounds, and high molecular antistatic agents.

Examples of the colorant include dyes and pigments.

In the sound-absorbing member of the present invention, the average particle size of the foamable resin particles used to form the board defining the second layer is preferably 300 μm to 2400 μm, more preferably 800 μm to 2000 μm.

The expansion ratio of the foamable resin particles is preferably 10 to 60 times.

When the expansion ratio is in the range of 10 times to 60 times, the density of the resin can be easily adjusted within the range of 0.02 to 0.1 g/cm³.

When the expansion ratio is less than 10 times, the sound-absorbing member may be too hard or too heavy. When the expansion ratio is more than 60 times, the sound-absorbing member may have insufficient strength.

In the sound-absorbing member of the present invention, the foamed resin used as the board defining the second layer may be polyurethane or the like. Polyurethane as a main component is mixed with a blowing agent or the like to be foamed and molded to obtain a foamed resin containing air bubbles, whereby a board can be produced.

In the sound-absorbing member of the present invention, the resin used as the board defining the second layer may be a thermoplastic resin or a thermosetting resin.

In the sound-absorbing member of the present invention, the thermoplastic resin used as the board defining the second layer may be a polypropylene resin, a polyethylene resin, a polyester resin (such as nylon 6,6), a polystyrene resin, or the like. The sound-absorbing member can be produced by molding a thermoplastic resin into resin pellets, heating the resin pellets, and molding the resin pellets by injection molding, extrusion, or the like.

In the sound-absorbing member of the present invention, the thermosetting resin used as the board defining the second layer may be an epoxy resin, a phenolic resin, a melamine resin, a urea resin, polyurethane, polyurea, polyamide, polyacrylamide, or the like. The sound-absorbing member can be produced by pre-heating a thermosetting resin, placing the thermosetting resin in a mold, pressurizing, and increasing the mold temperature to cure the thermosetting resin.

In the sound-absorbing member of the present invention, fibers used to form the board defining the second layer are preferably organic fibers or inorganic fibers. The organic fibers may be polyester, polyamide, or acetate fibers, for example. The inorganic fibers are preferably fibers of alumina, silica, or mullite fibers. The fibers are preferably bonded to each other by a binder to form felt.

In the sound-absorbing member of the present invention, the sheet defining the second layer may be made of an inorganic material, a metal material, or the like, besides resin.

In the sound-absorbing member of the present invention, the thickness of the board defining the second layer is preferably 10 to 120 mm. The thickness is more preferably 20 to 100 mm.

In the sound-absorbing member of the present invention, the first layer and the second layer may be adhered to each other by an adhesive.

Alternatively, a female member and a male member may be provided on an upper layer and a lower layer, respectively, at a contact portion between these layers to connect the upper layer to the lower layer by engaging the female member with the male member.

The case where the sound-absorbing member includes two layers is described with reference to the drawings.

FIG. 1 is a schematic cross-sectional view of an exemplary sound-absorbing member of the present invention.

Figure 2:
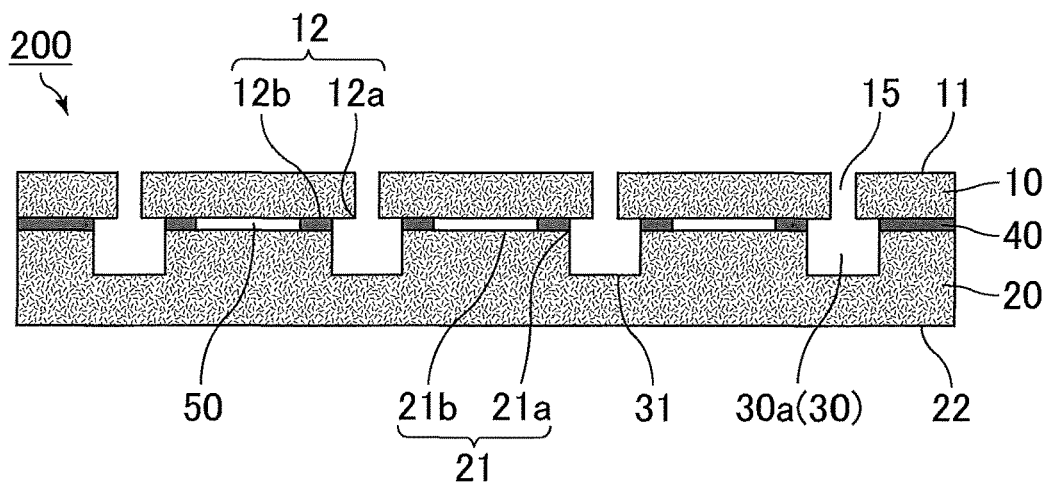
FIG. 2 is a schematic cross-sectional view of an exemplary sound-absorbing member of the present invention.

FIG. 2 is a schematic cross-sectional view of an exemplary sound-absorbing member of the present invention.

Figure 3:
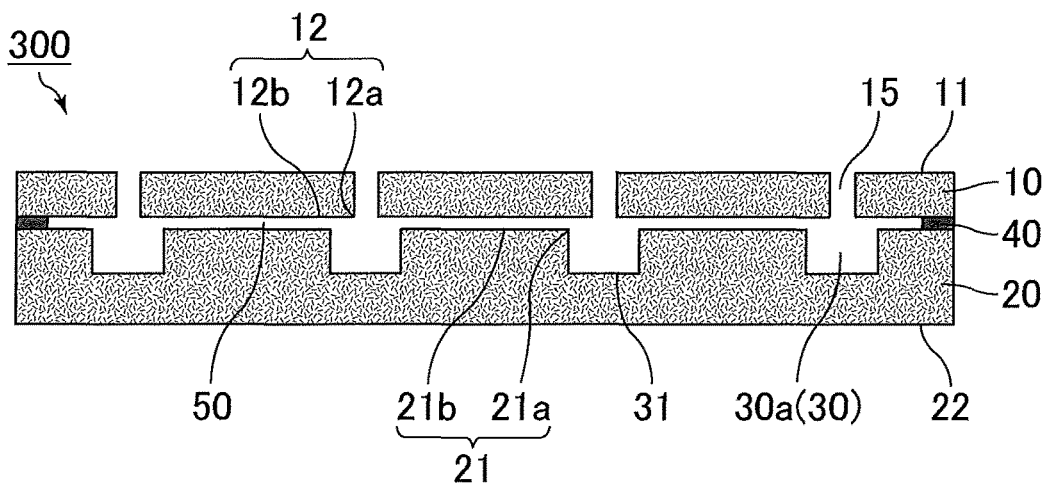
FIG. 3 is a schematic cross-sectional view of an exemplary sound-absorbing member of the present invention.

FIG. 3 is a schematic cross-sectional view of an exemplary sound-absorbing member of the present invention.

Figure 4:
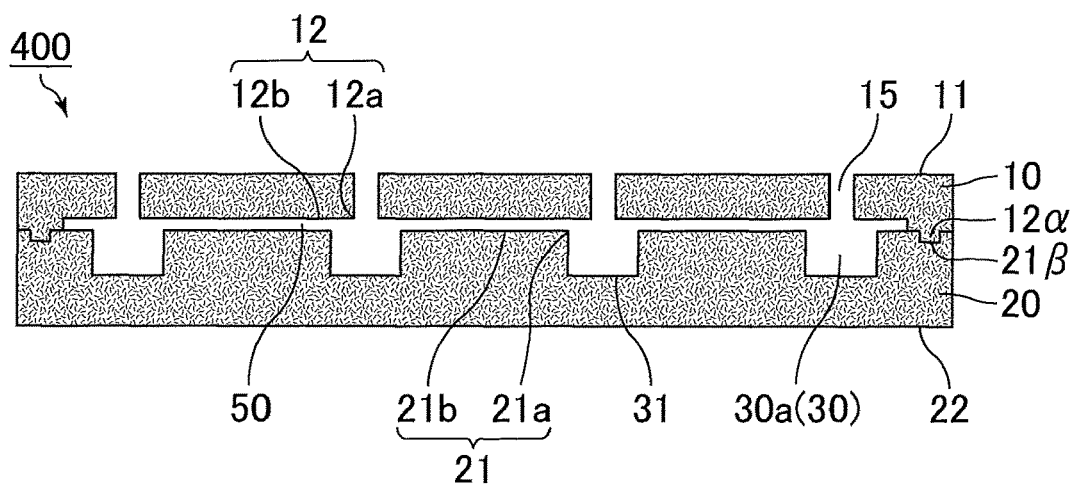
FIG. 4 is a schematic cross-sectional view of an exemplary sound-absorbing member of the present invention.

FIG. 4 is a schematic cross-sectional view of an exemplary sound-absorbing member of the present invention.

Figure 5:
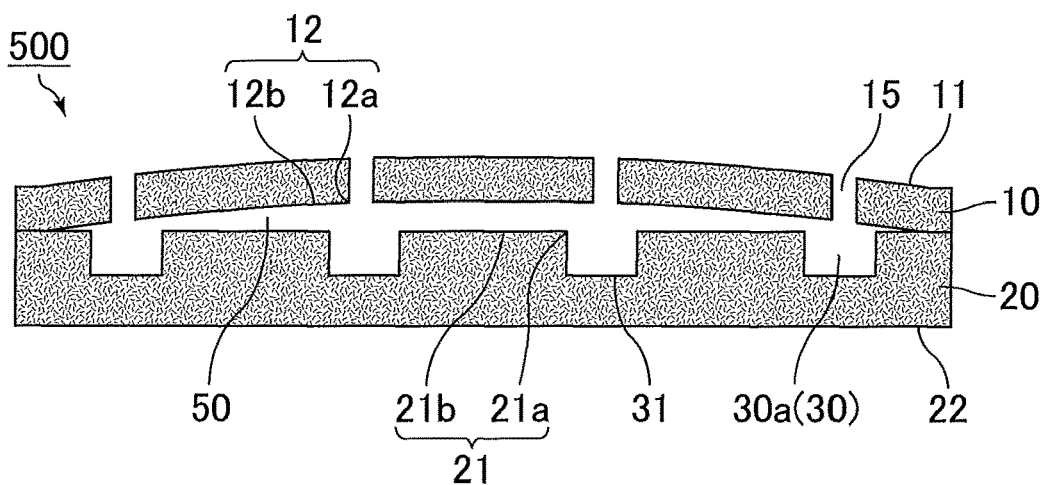
FIG. 5 is a schematic cross-sectional view of an exemplary sound-absorbing member of the present invention.

FIG. 5 is a schematic cross-sectional view of an exemplary sound-absorbing member of the present invention.

The sound-absorbing member of the present invention may have a structure as shown in FIG. 1.

Specifically, a sound-absorbing member 100 which is an example of the sound-absorbing member of the present invention includes a first layer 10 and a second layer 20 disposed on the first layer 10.

The first layer 10 includes a first main surface 11 and a second main surface 12 opposite to the first main surface 11. The first layer 10 also includes a first through-hole 15 penetrating through the second main surface 12 from the first main surface 11 and defining an inlet passage. Further, the second main surface 12 includes a second main surface opening 12a defining an end portion of the first through-hole 15 and a second main surface flat portion 12b.

The second layer 20 includes a third main surface 21 facing the second main surface 12 and a fourth main surface 22 opposite to the third main surface 21. The second layer 20 also includes a blind hole 30a on the third main surface 21 side. Further, the third main surface 21 includes a third main surface opening 21a defining an end portion of the blind hole 30a and a third main surface flat portion 21b.

The second main surface opening 12a has an opening area smaller than the opening area of the third main surface opening 21a.

In the sound-absorbing member 100, the first layer 10 and the second layer 20 are partially adhered to each other by an adhesive layer 40, and the blind hole 30a defines a hollow portion 30. The hollow portion 30 has a bottom 31 in the second layer 20.

A first air layer 50 is formed between the second main surface flat portion 12b and the third main surface flat portion 21b.

The first air layer 50 is connected to the hollow portion 30.

The formation of the first air layer 50 improves the sound absorption coefficient by the spring-mass effect.

The sound-absorbing member of the present invention may have a structure as shown in FIG. 2.

Specifically, a sound-absorbing member 200 which is an example of the sound-absorbing member of the present invention includes the first layer 10 and the second layer 20 disposed on the first layer 10.

The first layer 10 includes the first main surface 11 and the second main surface 12 opposite to the first main surface 11. The first layer 10 also includes the first through-hole 15 penetrating through the second main surface 12 from the first main surface 11 and defining an inlet passage. Further, the second main surface 12 includes the second main surface opening 12a defining an end portion of the first through-hole 15 and the second main surface flat portion 12b.

The second layer 20 includes the third main surface 21 facing the second main surface 12 and the fourth main surface 22 opposite to the third main surface 21. The second layer 20 also includes the blind hole 30a on the third main surface 21 side. Further, the third main surface 21 includes the third main surface opening 21a defining an end portion of the blind hole 30a and the third main surface flat portion 21b.

The second main surface opening 12a has an opening area smaller than the opening area of the third main surface opening 21a.

In the sound-absorbing member 200, the first layer 10 and the second layer 20 are partially adhered to each other by the adhesive layer 40, and the blind hole 30a defines the hollow portion 30. The hollow portion 30 has a bottom 31 in the second layer 20.

The first air layer 50 is formed between the second main surface flat portion 12b and the third main surface flat portion 21b.

The first air layer 50 is not connected to the hollow portion 30.

The formation of the first air layer 50 improves the sound absorption coefficient by the spring-mass effect.

The sound-absorbing member of the present invention may have a structure as shown in FIG. 3.

Specifically, a sound-absorbing member 300 which is an example of the sound-absorbing member of the present invention includes the first layer 10 and the second layer 20 disposed on the first layer 10.

The first layer 10 includes the first main surface 11 and the second main surface 12 opposite to the first main surface 11. The first layer 10 also includes the first through-hole 15 penetrating through the second main surface 12 from the first main surface 11 and defining an inlet passage. Further, the second main surface 12 includes the second main surface opening 12a defining an end portion of the first through-hole 15 and the second main surface flat portion 12b.

The second layer 20 includes the third main surface 21 facing the second main surface 12 and the fourth main surface 22 opposite to the third main surface 21. The second layer 20 also includes the blind hole 30a on the third main surface 21 side. Further, the third main surface 21 includes the third main surface opening 21a defining an end portion of the blind hole 30a and the third main surface flat portion 21b.

The second main surface opening 12a has an opening area smaller than the opening area of the third main surface opening 21a.

In the sound-absorbing member 300, edges of the second main surface flat portion 12b and edges of the third main surface flat portion 21b are adhered to each other by the adhesive layer 40. The blind hole 30a defines the hollow portion 30, and the hollow portion 30 has the bottom 31 in the second layer 20.

The first air layer 50 is formed between the second main surface flat portion 12b and the third main surface flat portion 21b. The first air layer 50 is connected to the hollow portion 30.

The formation of the first air layer 50 improves the sound absorption coefficient by the spring-mass effect.

The sound-absorbing member of the present invention may have a structure as shown in FIG. 4.

Specifically, a sound-absorbing member 400 which is an example of the sound-absorbing member of the present invention includes the first layer 10 and the second layer 20 disposed on the first layer 10.

The first layer 10 includes the first main surface 11 and the second main surface 12 opposite to the first main surface 11. The first layer 10 also includes the first through-hole 15 penetrating through the second main surface 12 from the first main surface 11 and defining an inlet passage. Further, the second main surface 12 includes the second main surface opening 12a defining an end portion of the first through-hole 15 and the second main surface flat portion 12b.

The second layer 20 includes the third main surface 21 facing the second main surface 12 and the fourth main surface 22 opposite to the third main surface 21. The second layer 20 also includes the blind hole 30a on the third main surface 21 side. Further, the third main surface 21 includes the third main surface opening 21a defining an end portion of the blind hole 30a and the third main surface flat portion 21b.

The second main surface opening 12a has an opening area smaller than the opening area of the third main surface opening 21a.

In the sound-absorbing member 400, the second main surface flat portion 12b includes a male member 12α and the third main surface flat portion 21b includes a female member 21β. These members are engaged together to connect the first layer 10 to the second layer 20.

In the sound-absorbing member 400, the blind hole 30a defines the hollow portion 30, and the hollow portion 30 has the bottom 31 in the second layer 20.

The first air layer 50 is formed between the second main surface flat portion 12b and the third main surface flat portion 21b.

The first air layer 50 is connected to the hollow portion 30.

The formation of the first air layer 50 improves the sound absorption coefficient by the spring-mass effect.

The sound-absorbing member of the present invention may have a structure as shown in FIG. 5.

Specifically, a sound-absorbing member 500 which is an example of the sound-absorbing member of the present invention includes the first layer 10 and the second layer 20 disposed on the first layer 10.

The first layer 10 includes the first main surface 11 and the second main surface 12 opposite to the first main surface 11. The first layer 10 also includes the first through-hole 15 penetrating through the second main surface 12 from the first main surface 11 and defining an inlet passage. Further, the second main surface 12 includes the second main surface opening 12a defining an end portion of the first through-hole 15 and the second main surface flat portion 12b.

The second layer 20 includes the third main surface 21 facing the second main surface 12 and the fourth main surface 22 opposite to the third main surface 21. The second layer 20 also includes the blind hole 30a on the third main surface 21 side. Further, the third main surface 21 includes the third main surface opening 21a defining an end portion of the blind hole 30a and the third main surface flat portion 21b.

The second main surface opening 12a has an opening area smaller than the opening area of the third main surface opening 21a.

In the sound-absorbing member 500, the second main surface flat portion 12b and the third main surface flat portion 21b are adhered to each other at the edges by an adhesive.

In the sound-absorbing member 500, the blind hole 30a defines the hollow portion 30, and the hollow portion 30 has the bottom 31 in the second layer 20.

The first layer 10 is curved in a convex shape, and the first air layer 50 is formed between the second main surface flat portion 12b and the third main surface flat portion 21b.

In other words, the first layer 10 is curved such that the second main surface flat portion 12b is convex.

The first air layer 50 is connected to the hollow portion 30.

The formation of the first air layer 50 improves the sound absorption coefficient by the spring-mass effect.

Subsequently, a method of producing a sound-absorbing member including two layers is described.

The sound-absorbing member of the present invention can be produced by stacking the first layer including a first through-hole in a board and the second layer including a hollow portion.

A method of producing the sound-absorbing member of the present invention includes:

producing an upper layer that is a board including a pillar-shaped first through-hole that defines an inlet passage;

producing a second layer that is a board including a hollow portion; and stacking the first layer and the second layer in such a manner that a first air layer is formed between a second main surface flat portion of the first layer and a third main surface flat portion of the second layer.

(Producing First Layer)

A board having a predetermined thickness is prepared. The sheet is made from a material such as resin that can be used as a board.

The first layer can be produced by forming a first through-hole in the board by means such as punching, drilling, or lasing.

When a foamed resin formed from foamable resin particles (beads) is used as the board, the first layer including the first through-hole in the board can also be produced by providing a protrusion for forming the first through-hole in a mold and foaming the foamable resin particles.

When the first layer and the second layer are stacked without forming an adhesive layer in the step of stacking the first layer and the second layer (described later), an engaging portion (a male member or a female member) may be formed on the first layer.

(Producing Second Layer)

A board having a predetermined thickness is prepared. The sheet is made from a material such as resin that can be used as a board.

In a sheet, a blind hole that defines a hollow portion is formed to extend halfway in the thickness direction, whereby the second layer can be produced. The blind hole is formed such that its diameter is larger than the diameter of the first through-hole.

The blind hole is preferably formed by machine processing. Cutting with an end mill or cutting with hot wire is preferred.

Alternatively, a board integrally molded with a blind hole by injection molding or press molding may be produced.

When a foamed resin formed from foamable resin particles (beads) is used as the board, the board including a blind hole can also be produced by foam molding in a mold including a protrusion corresponding to the shape of the blind hole.

When the first layer and the second layer are stacked without forming an adhesive layer in the step of stacking the first layer and the second layer (described later), an engaging portion (a male member or a female member) may be formed on the second layer.

(Stacking First Layer and Second Layer)

Next, when adhering the first layer to the second layer by an adhesive, an adhesive in the form of a sheet is cut into the shape of a blind hole (hollow portion) in the second layer at a position corresponding to the position of the blind hole. Here, the adhesive is formed into an adhesive layer in the form of a sheet such that the first air layer is formed between the second main surface flat portion of the first layer and the third main surface flat portion of the second layer.

The adhesive is sandwiched between the first layer and the second layer to exhibit its adhesive force therebetween, whereby the first layer and the second layer can be adhered to each other by the adhesive layer.

When stacking the first layer, the adhesive layer, and the second layer, the positions of the first through-hole in the first layer and the hollow portion (blind hole) in the second layer are aligned to form a Helmholtz resonance structure.

The adhesive is applied according to the shape and position of the blind hole (hollow portion) in the second layer, and the first layer and the second layer are stacked to allow the adhesive to exhibit its adhesive force, whereby the first layer and the second layer can be adhered to each other by the adhesive layer.

Conditions to allow the adhesive to exhibit its adhesive force may be adjusted according to adhesive characteristics of the adhesive.

When connecting the first layer to the second layer by the engaging portions, the engaging portions on the first layer and the second layer are engaged together to connect the first layer to the second layer.

Next, a case is described where the sound-absorbing member includes three layers.

In this case, the sound-absorbing member of the present invention having a Helmholtz resonance structure can be produced by stacking the first layer including the inlet passage, and the second layer and the third layer together forming the hollow portion.

The first layer and the second layer may be stacked in any manner as long as the first air layer is formed between the second main surface flat portion of the first layer and the third main surface flat portion of the second layer.

For example, an adhesive layer may be formed at a portion between the second main surface flat portion and the third main surface flat portion to stack the first layer and the second layer. Here, the first layer and the second layer may be adhered to each other only at the end portions of the first layer and the second layer.

Alternatively, engaging portions (a male member and a female member) may be formed on the second main surface flat portion and the third main surface flat portion such that the male member is engaged with the female member, whereby the first layer and the second layer are stacked.

In the sound-absorbing member of the present invention, the first through-hole is preferably cylindrical, and the cross-sectional shape in a direction perpendicular to the longitudinal direction is preferably a true circle. When the first through-hole is cylindrical, the inlet passage is cylindrical. The inlet passage having a cylindrical shape is advantageous because sound absorption characteristics without anisotropy are achieved.

In the sound-absorbing member of the present invention, when the first through-hole is cylindrical, the diameter of the bottom is preferably 1 to 30 mm.

In other words, in the sound-absorbing member of the present invention, the inlet passage preferably has an inner diameter of 1 to 30 mm.

When the shape of the first through-hole is not cylindrical, the diameter of the first through-hole is defined as the equivalent circle diameter. The equivalent circle diameter is the diameter of a true circle having the same area as that of a cross-sectional area of the first through-hole obtained by cutting the first through-hole in a direction perpendicular to the longitudinal direction. When the cross-sectional shape of the first through-hole is a true circle, the diameter can be directly defined as the equivalent circle diameter.

In the sound-absorbing member of the present invention, the first through-holes in the first layer may be arranged in a square pattern in which squares are continuously arranged in longitudinal and transverse directions and the first through-holes are arranged at the corners of the squares in a plan view. Alternatively, the first through-holes may be arranged in a zigzag pattern in which equilateral triangles are continuously arranged in longitudinal and transverse directions and the first through-holes are arranged at the corners of the triangles in a plan view.

Of these, the zigzag pattern is preferred. When the first through-holes are arranged in the zigzag pattern, all the adjacent first through-holes tend to have the same interval, which improves the sound absorption effect. The zigzag pattern also provides strength to the first layer in the form of a board.

In the sound-absorbing member of the present invention, the sheet defining the first layer is preferably made of resin.

The resin is preferably a foamed resin or elastomer such as rubber.

The sound-absorbing member in which the board defining the first layer is made of resin is particularly preferred as a vehicle component because the weight reduction can be easily achieved.

When the resin is a foamed resin, the weight can be further reduced, and the resulting sound-absorbing member used as a vehicle component can contribute to better fuel economy.

In the sound-absorbing member of the present invention, the board defining the first layer may be a composite material of resin and fibers. A composite material may be obtained by mixing resin and fibers. The resin and fibers may be combined in blocks or the resin and fibers in the form of boards may be stacked.

The resin is preferably a foamed resin formed from foamable resin particles (beads), a foamed resin containing air bubbles, a thermoplastic resin, or a thermosetting resin.

The density of the resin is preferably 0.01 to 1 g/cm$^3$, more preferably 0.02 to 0.1 g/cm$^3$. When the resin is a foamed resin, the density of the resin is the density of the foamed resin obtained by foam molding.

When the density of the resin is in the above range, the resulting sound-absorbing member can easily achieve required strength.

When the density of the resin is less than 0.01 g/cm$^3$, the resulting sound-absorbing member may not achieve sufficient mechanical strength. When the density of the resin is more than 1 g/cm$^3$, the resulting sound-absorbing member has an increased weight, which interferes with vehicle weight reduction.

The resin is more preferably a foamed resin formed from foamable resin particles (beads). When the resin is a foamed resin formed from foamable resin particles (beads), the resulting sound-absorbing member can have a lighter weight while its strength is maintained. Such a sound-absorbing member when used in a vehicle component can contribute to better fuel economy.

The foamed resin is obtained by foam molding foamable resin particles.

In the sound-absorbing member of the present invention, foamable resin particles (beads) used to form the board defining the first layer are particles containing a blowing agent inside each resin particle, and any known foamable resin particles can be suitably used.

Examples of a resin component of the foamable resin particles include olefin resins such as polyethylene and polypropylene, and styrene resins such as polystyrene.

Examples of the styrene resins include styrene homopolymer and copolymers obtainable by copolymerization of styrene and a monomer copolymerizable with styrene (or its derivative). The styrene copolymer may be any of a block copolymer, a random copolymer, or a graft copolymer.

Examples of the blowing agent include hydrocarbons such as propane, butane, and pentane.

In the sound-absorbing member of the present invention, if necessary, a known additive may be added to the foamable resin particles used to form the board defining the first layer. Examples of such known additive include flame retardants, flame retardant aids, processing aids, fillers, antioxidants, light-resistant stabilizers, antistatic agents, and colorants. As an example of use of an additive, a black colorant may be used so as to make stain less noticeable.

Examples of the flame retardant include hydrated metal flame retardants such as aluminum hydroxide and magnesium hydroxide; phosphate flame retardants such as red phosphorus and ammonium phosphate; halogen flame retardants such as tetrabromobisphenol A (TABB), brominated polystyrene, and chlorinated paraffin; and nitrogen flame retardants such as ammonium carbonate and melamine cyanurate.

Examples of the flame retardant aid include antimony trioxide and antimony pentoxide.

Examples of the processing aid include stearate, liquid paraffin, olefin wax, stearylamide compounds, and epoxy compounds.

Examples of the filler include silica, talc, and calcium silicate.

Examples of the antioxidant include alkylphenol, alkylene bisphenol, alkylphenol thioether, β,β-thiopropionare, organic phosphite, and phenol-nickel composite.

Examples of the light-resistant stabilizer include benzotriazole ultraviolet absorbers and hindered amine stabilizers.

Examples of the antistatic agent include low molecular antistatic agents such as fatty acid ester compounds, aliphatic ethanolamine compounds, and aliphatic ethanolamide compounds, and high molecular antistatic agents.

Examples of the colorant include dyes and pigments.

In the sound-absorbing member of the present invention, the average particle size of the foamable resin particles used to form the board defining the first layer is preferably 300 μm to 2400 μm, more preferably 800 μm to 2000 μm.

The expansion ratio of the foamable resin particles is preferably 10 to 60 times.

When the expansion ratio is in the range of 10 times to 60 times, the density of the resin can be easily adjusted within the range of 0.02 to 0.1 g/cm$^3$.

When the expansion ratio is less than 10 times, the sound-absorbing member may be too hard or too heavy. When the expansion ratio is more than 60 times, the sound-absorbing member may have insufficient strength.

In the sound-absorbing member of the present invention, the foamed resin used as the board defining the first layer may be polyurethane or the like. Polyurethane as a main component is mixed with a blowing agent or the like to be foamed and molded to obtain a foamed resin containing air bubbles, whereby a board can be produced.

In the sound-absorbing member of the present invention, the resin used as the board defining the first layer may be a thermoplastic resin or a thermosetting resin.

In the sound-absorbing member of the present invention, the thermoplastic resin used as the board defining the first layer may be a polypropylene resin, a polyethylene resin, a polyester resin (such as nylon 6,6), a polystyrene resin, or the like. The sound-absorbing member can be produced by molding a thermoplastic resin into resin pellets, heating the resin pellets, and molding the resin pellets by injection molding, extrusion, or the like.

In the sound-absorbing member of the present invention, the thermosetting resin used as the board defining the first layer may be an epoxy resin, a phenolic resin, a melamine resin, a urea resin, polyurethane, polyurea, polyamide, polyacrylamide, or the like. The sound-absorbing member can be produced by pre-heating a thermosetting resin, placing the thermosetting resin in a mold, pressurizing, and increasing the mold temperature to cure the thermosetting resin.

In the sound-absorbing member of the present invention, the board defining the first layer may be made of an inorganic material, a metal material, or the like, besides resin.

In the sound-absorbing member of the present invention, the thickness of the board defining the first layer is preferably 1 to 20 mm. The thickness of the board is the length of the first through-hole, which is the length of the inlet passage. In other words, the length of the first through-hole is preferably 1 to 20 mm. The length of the inlet passage is also preferably 1 to 20 mm.

In the sound-absorbing member of the present invention, the first main surface includes the first main surface opening defining an end portion of the first through-hole and the first main surface flat portion. Preferably, a fiber layer is disposed on the first main surface flat portion.

The sound-absorbing member having a Helmholtz resonance structure can absorb sound in a predetermined frequency range, but the frequency range that can be absorbed is narrow, and particularly, sound in a high frequency range of 2000 Hz and above cannot be sufficiently absorbed.

Yet, when the fiber layer is formed, the sound-absorbing member can absorb sound in a high frequency range of 2000 Hz and above.

A material of the fiber layer is preferably selected from the group consisting of natural fibers, synthetic resin fibers, and inorganic fibers. Examples of the natural fibers include plant fibers, animal fibers, and mineral fibers. Examples of the synthetic resin fibers include polyamide resins (e.g., nylon), polyester resins (e.g., polyethylene terephthalate (PET) and polyethylene naphthalate (PEN)), acrylic resins, polyvinyl alcohol resins, and polyolefin resins (e.g., polyethylene and polypropylene). Examples of the inorganic fibers include alumina fibers, silica fibers, silica-alumina fibers, glass fibers, carbon fibers, potassium titanate fibers, and rock wool.

The fiber layer may be provided in the form of felt or a non-woven fabric.

The thickness of the fiber layer is preferably 1 to 20 mm.

Since spaces are formed between fibers in the fiber layer, air vibrates in the spaces, enabling absorption of sound in a high frequency range.

The first main surface flat portion and the fiber layer may be adhered to each other by an adhesive layer, or may not be adhered to each other.

In the sound-absorbing member of the present invention, the second layer may be a board including a pillar-shaped second through-hole having a larger opening diameter than the first through-hole, and the third layer may be a board not including a through-hole.

A hollow portion can be formed by stacking the second layer and the third layer.

The second layer is a board including a second through-hole.

The second through-hole has a pillar shape, and is portion where a pillar-shaped space is formed by air only. The diameter of the through-hole from the inlet side to the outlet side preferably remains constant in the thickness direction of the board.

In other words, preferably, the board is not one including a hole that is not penetrating in the thickness direction. For example, preferably, the board is not one having a continuous pore, such as one included in a porous material, which allows gas to pass therethrough but which is not see-through in the thickness direction when seen from the top.

The second through-hole is preferably a through-hole formed by machine processing on a board. The second through-hole is preferably formed by punching, drilling, or lasing, for example.

In the sound-absorbing member of the present invention, the second through-hole in the second layer is preferably cylindrical, and the cross-sectional shape in a direction perpendicular to the longitudinal direction is preferably a true circle. When the second through-hole is cylindrical, the hollow portion is cylindrical. The hollow portion having a cylindrical shape is advantageous because sound absorption characteristics without anisotropy are achieved.

In the sound-absorbing member of the present invention, when the second through-hole is cylindrical, the diameter (opening diameter) of the bottom is preferably 4 to 171 mm. The diameter is more preferably 10 mm or more, and is more preferably 150 mm or less.

In the sound-absorbing member of the present invention, the second through-holes in the second layer may be arranged in a square pattern in which squares are continuously arranged in longitudinal and transverse directions and the second through-holes are arranged at the corners of the squares in a plan view. Alternatively, the second through-holes may be arranged in a zigzag pattern in which equilateral triangles are continuously arranged in longitudinal and transverse directions and the second through-holes are arranged at the corners of the triangles in a plan view.

Of these, the zigzag pattern is preferred. When the second through-holes are arranged in the zigzag pattern, all the hollow portions formed by adjacent second through-holes tend to have the same interval, which improves the sound absorption effect. The zigzag pattern also provides strength to the second layer in the form of a board.

In the sound-absorbing member of the present invention, the thickness of the sheet defining the second layer is preferably 1 to 20 mm, more preferably 3 to 15 mm. The thickness of the board defining the second layer is the length of the second through-hole, which is the height of the hollow portion. In other words, the length of the second through-hole is preferably 1 to 20 mm.

The third layer is a sheet not including a through-hole.

When the second layer and the third layer are stacked, a hollow portion is formed by the second through-hole in the second layer and the third layer.

In the sound-absorbing member of the present invention, the thickness of the board defining the third layer is preferably 1 to 20 mm.

In the fourth main surface of the second layer, the end portion of the second through-hole is the fourth main surface opening, and the rest is the fourth main surface flat portion.

In addition, the surface facing the fourth main surface of the second layer is the fifth main surface of the third layer, and the surface opposite to the fifth main surface is the sixth main surface of the third layer.

In this case, in the sound-absorbing member of the present invention, the second air layer is preferably formed at least at a portion between the fourth main surface flat portion and the fifth main surface.

The sound absorption efficiency further increases when the second air layer is present in addition to the first air layer between the fourth main surface flat portion of the second layer and the fifth main surface of the third layer.

In the sound-absorbing member of the present invention, the second air layer may or may not be connected to the hollow portion, but it is more preferred when the second air layer is connected to the hollow portion.

The sound absorption coefficient increases when the second air layer is connected to the hollow portion.

The second layer and the third layer may be stacked in any manner.

For example, an adhesive layer may be formed at a portion between the fourth main surface flat portion and the fifth main surface to stack the second layer and the third layer. The second layer and the third layer may be adhered to each other only at the end portions of the second layer and the third layer.

Further, engaging portions (a male member and a female member) may be formed on the fourth main surface flat portion and the fifth main surface such that the male member is engaged with the female member, whereby the second layer and the third layer are stacked.

In the sound-absorbing member of the present invention, the fourth main surface flat portion and the fifth main surface may be partially in contact with each other.

Even when the fourth main surface flat portion and the fifth main surface are partially in contact with each other, the sound absorption coefficient increases as long as the second air layer is formed at a portion between the fourth main surface flat portion and the fifth main surface.

In the sound-absorbing member of the present invention, a spacer may or may not be provided between the fourth main surface flat portion and the fifth main surface to form the second air layer.

The spacer makes it possible to reliably form the second air layer in the sound-absorbing member of the present invention.

When no spacer is provided, it is advantageous in that the spring-mass effect is not diminished by the spacer.

In the sound-absorbing member of the present invention, the sheets defining the second layer and the third layer are preferably made of resin and/or a fibrous material. The resin is preferably a foamed resin or elastomer such as rubber.

The boards defining the second layer and the third layer are preferably the same materials but may be different materials.

The resin is preferably a foamed resin.

The sound-absorbing member in which the boards defining the second layer and the third layer are made of resin is particularly preferred as a vehicle component because the weight reduction can be easily achieved.

When the resin is a foamed resin, the weight can be further reduced, and the resulting sound-absorbing member used as a vehicle component can contribute to better fuel economy.

In the sound-absorbing member of the present invention, the sheets defining the second layer and the third layer may be a composite material of resin and fibers. A composite material may be obtained by mixing resin and fibers. The resin and fibers may be combined in blocks or the resin and fibers in the form of sheets may be stacked.

The resin is preferably a foamed resin formed from foamable resin particles (beads), a foamed resin containing air bubbles, a thermoplastic resin, or a thermosetting resin.

The density of the resin is preferably 0.01 to 1 $g/cm^3$, more preferably 0.02 to 0.1 $g/cm^3$. When the resin is a foamed resin, the density of the resin is the density of the foamed resin obtained by foam molding.

When the density of the resin is in the above range, the resulting sound-absorbing member can easily achieve required strength.

When the density of the resin is less than 0.01 $g/cm^3$, the resulting sound-absorbing member may not achieve sufficient mechanical strength. When the density of the resin is more than 1 $g/cm^3$, the resulting sound-absorbing member has an increased weight, which interferes with vehicle weight reduction.

The resin is more preferably a foamed resin formed from foamable resin particles (beads). When the resin is a foamed resin formed from foamable resin particles (beads), the resulting sound-absorbing member can have a lighter weight while its strength is maintained. Such a sound-absorbing member when used in a vehicle component can contribute to better fuel economy.

The foamed resin is obtained by foam molding foamable resin particles.

The board formed from the foamed resin formed from foamable resin particles (beads) does not include continuous pores.

In the sound-absorbing member of the present invention, foamable resin particles (beads) used to form the boards defining the second layer and the third layer are particles containing a blowing agent inside each resin particle, and any known foamable resin particles can be suitably used.

Examples of a resin component of the foamable resin particles include olefin resins such as polyethylene and polypropylene, and styrene resins such as polystyrene.

Examples of the styrene resins include styrene homopolymer and copolymers obtainable by copolymerization of styrene and a monomer copolymerizable with styrene (or its derivative). The styrene copolymer may be any of a block copolymer, a random copolymer, or a graft copolymer.

Examples of the blowing agent include hydrocarbons such as propane, butane, and pentane.

In the sound-absorbing member of the present invention, if necessary, a known additive may be added to the foamable resin particles used to form the boards defining the second layer and the third layer. Examples of such known additive include flame retardants, flame retardant aids, processing aids, fillers, antioxidants, light-resistant stabilizers, antistatic agents, and colorants. As an example of use of an additive, a black colorant may be used so as to make stain less noticeable.

Examples of the flame retardant include hydrated metal flame retardants such as aluminum hydroxide and magnesium hydroxide; phosphate flame retardants such as red phosphorus and ammonium phosphate; halogen flame retardants such as tetrabromobisphenol A (TABB), brominated polystyrene, and chlorinated paraffin; and nitrogen flame retardants such as ammonium carbonate and melamine cyanurate.

Examples of the flame retardant aid include antimony trioxide and antimony pentoxide.

Examples of the processing aid include stearate, liquid paraffin, olefin wax, stearylamide compounds, and epoxy compounds.

Examples of the filler include silica, talc, and calcium silicate.

Examples of the antioxidant include alkylphenol, alkylene bisphenol, alkylphenol thioether, β,β-thiopropionate, organic phosphite, and phenol-nickel composite.

Examples of the light-resistant stabilizer include benzotriazole ultraviolet absorbers and hindered amine stabilizers.

Examples of the antistatic agent include low molecular antistatic agents such as fatty acid ester compounds, aliphatic ethanolamine compounds, and aliphatic ethanolamide compounds, and high molecular antistatic agents.

Examples of the colorant include dyes and pigments.

In the sound-absorbing member of the present invention, the average particle size of the foamable resin particles used to form the boards defining the second layer and the third layer is preferably 300 μm to 2400 μm, more preferably 800 μm to 2000 μm.

The expansion ratio of the foamable resin particles is preferably 10 to 60 times.

When the expansion ratio is in the range of 10 times to 60 times, the density of the resin can be easily adjusted within the range of 0.02 to 0.1 g/cm$^3$.

When the expansion ratio is less than 10 times, the sound-absorbing member may be too hard or too heavy. When the expansion ratio is more than 60 times, the sound-absorbing member may have insufficient strength.

In the sound-absorbing member of the present invention, the foamed resin used as the boards defining the second layer and the third layer may be polyurethane or the like. Polyurethane as a main component is mixed with a blowing agent or the like to be foamed and molded to obtain a foamed resin containing air bubbles, whereby a sheet can be produced.

In the sound-absorbing member of the present invention, the resin used as the boards defining the resin second layer and the third layer may be a thermoplastic resin or a thermosetting resin.

In the sound-absorbing member of the present invention, the thermoplastic resin used as the boards defining the second layer and the third layer may be a polypropylene resin, a polyethylene resin, a polyester resin (such as nylon 6,6), a polystyrene resin, or the like. The sound-absorbing member can be produced by molding a thermoplastic resin into resin pellets, heating the resin pellets, and molding the resin pellets by injection molding, extrusion, or the like.

In the sound-absorbing member of the present invention, the thermosetting resin used as the boards defining the second layer and the third layer may be an epoxy resin, a phenolic resin, a melamine resin, a urea resin, polyurethane, polyurea, polyamide, polyacrylamide, or the like. The sound-absorbing member can be produced by pre-heating a thermosetting resin, placing the thermosetting resin in a mold, pressurizing, and increasing the mold temperature to cure the thermosetting resin.

Fibers used to form the boards defining the second layer and the third layer are preferably organic fibers or inorganic fibers. The organic fibers may be polyester, polyamide, or acetate fibers, for example. The inorganic fibers are preferably fibers of alumina, silica, or mullite fibers. The fibers are preferably bonded to each other by a binder to form felt.

In the sound-absorbing member of the present invention, the boards defining the second layer and the third layer may be made of an inorganic material, a metal material, or the like, besides resin.

The case where the sound-absorbing member includes three layers is described with reference to the drawings.

Figure 6:
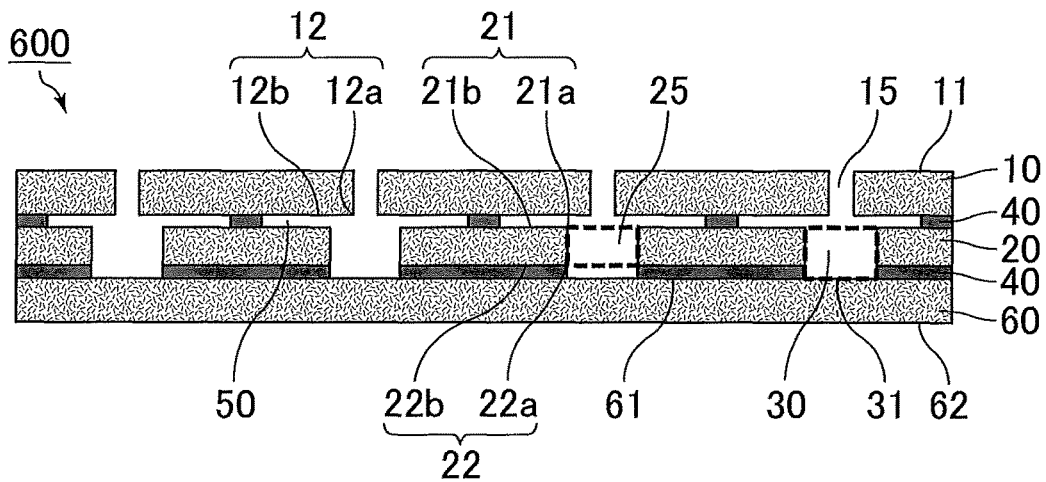
FIG. 6 is a schematic cross-sectional view of an exemplary sound-absorbing member of the present invention.

FIG. 6 is a schematic cross-sectional view of an exemplary sound-absorbing member of the present invention.

Figure 7:
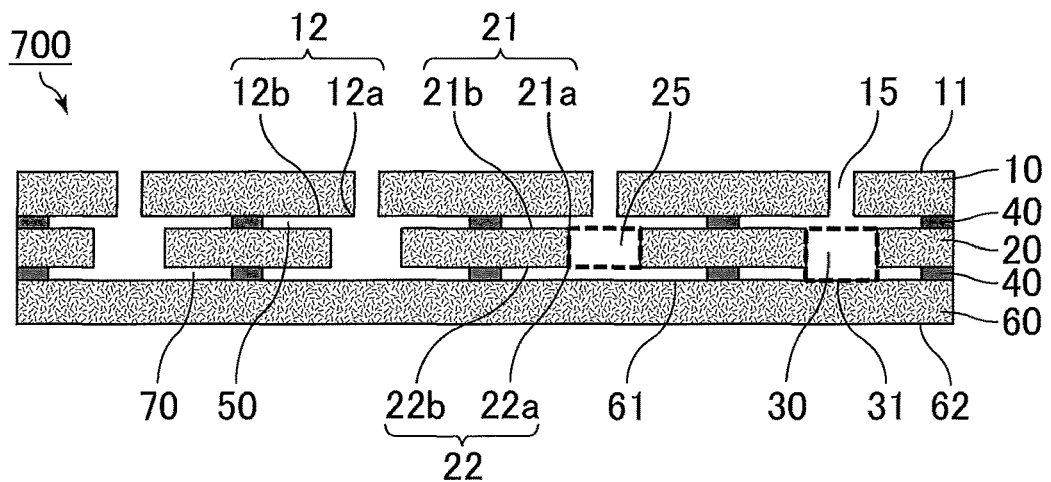
FIG. 7 is a schematic cross-sectional view of an exemplary sound-absorbing member of the present invention.

FIG. 7 is a schematic cross-sectional view of an exemplary sound-absorbing member of the present invention.

Figure 8:
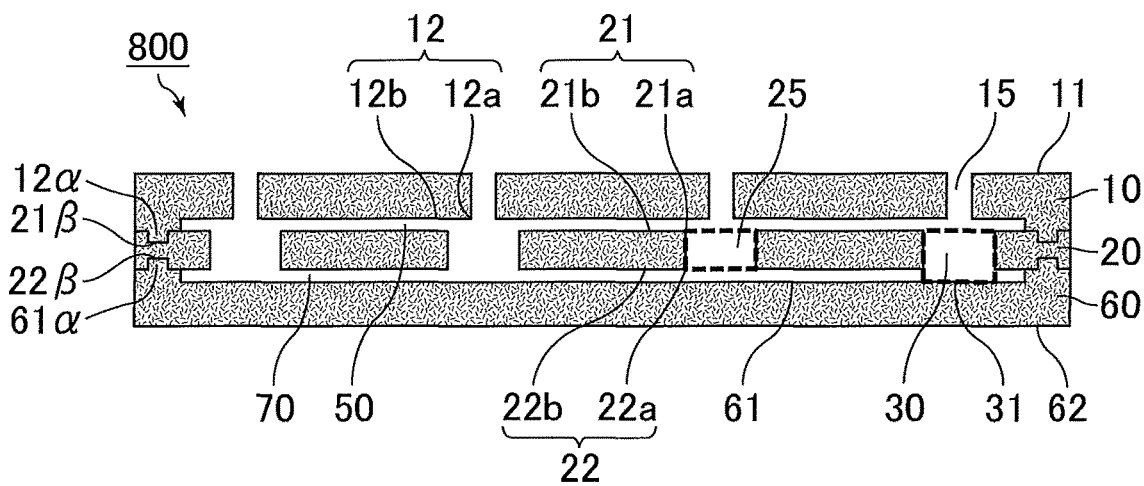
FIG. 8 is a schematic cross-sectional view of an exemplary sound-absorbing member of the present invention.

FIG. 8 is a schematic cross-sectional view of an exemplary sound-absorbing member of the present invention.

Figure 9:
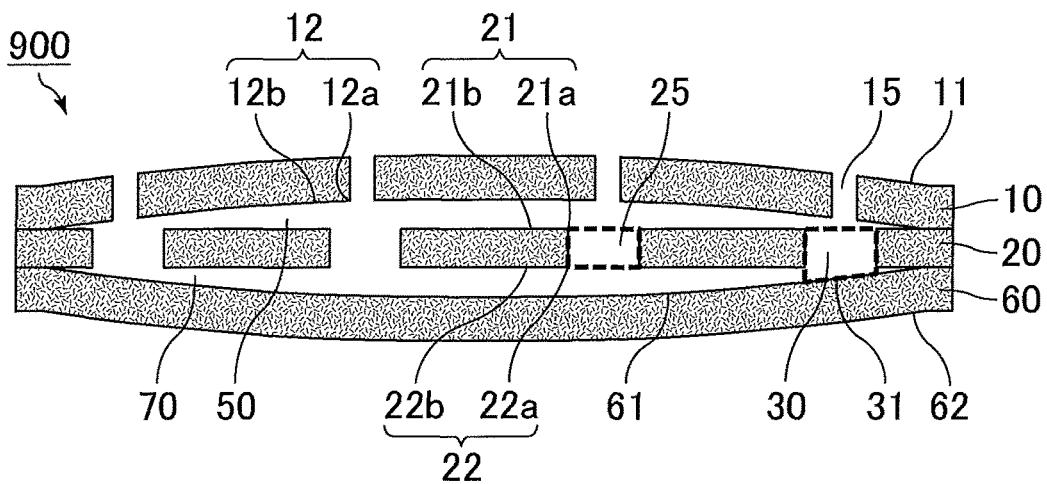
FIG. 9 is a schematic cross-sectional view of an exemplary sound-absorbing member of the present invention.

FIG. 9 is a schematic cross-sectional view of an exemplary sound-absorbing member of the present invention.

The sound-absorbing member of the present invention may have a structure as shown in FIG. 6.

Specifically, a sound-absorbing member 600 which is an example of the sound-absorbing member of the present invention includes the first layer 10, the second layer 20, and a third layer 60 which are sequentially stacked.

The first layer 10 includes the first main surface 11 and the second main surface 12 opposite to the first main surface 11. The first layer 10 also includes the first through-hole 15 penetrating through the second main surface 12 from the first main surface 11 and defining an inlet passage. Further, the second main surface 12 includes the second main surface opening 12a defining an end portion of the first through-hole 15 and the second main surface flat portion 12b.

The second layer 20 includes the third main surface 21 facing the second main surface 12 and the fourth main surface 22 opposite to the third main surface 21. The second layer 20 also includes a second through-hole 25 penetrating through the fourth main surface 22 from the third main surface 21. Further, the third main surface 21 includes the third main surface opening 21a defining an end portion of the second through-hole 25 and the third main surface flat portion 21b. The fourth main surface 22 also includes a fourth main surface opening 22a defining another end portion of the second through-hole 25 and a fourth main surface flat portion 22b.

The third layer 60 includes a fifth main surface 61 facing the fourth main surface 22 and a sixth main surface 62 opposite to the fifth main surface 61.

The second main surface opening 12a has an opening area smaller than the opening area of the third main surface opening 21a.

In the sound-absorbing member 600, the first layer 10 and the second layer 20 are partially adhered to each other by the adhesive layer 40.

The second through-hole 25 defines a lateral side the hollow portion 30, and the fifth main surface 61 defines the bottom 31 of the hollow portion 30.

The second layer 20 and the third layer 60 are stacked as the fourth main surface flat portion 22 is entirely adhered to the fifth main surface 61 by the adhesive layer 40.

The first air layer 50 is formed between the second main surface flat portion 12b and the third main surface flat portion 21b.

The first air layer 50 is connected to the hollow portion 30.

The formation of the first air layer 50 improves the sound absorption coefficient by the spring-mass effect by the air layer.

The sound-absorbing member of the present invention may have a structure as shown in FIG. 7.

Specifically, a sound-absorbing member 700 which is an example of the sound-absorbing member of the present invention includes the first layer 10, the second layer 20, and the third layer 60 which are sequentially stacked.

The first layer 10 includes the first main surface 11 and the second main surface 12 opposite to the first main surface 11. The first layer 10 also includes the first through-hole 15 penetrating through the second main surface 12 from the first main surface 11 and defining an inlet passage. Further, the second main surface 12 includes the second main surface opening 12a defining an end portion of the first through-hole 15 and the second main surface flat portion 12b.

The second layer 20 includes the third main surface 21 facing the second main surface 12 and the fourth main surface 22 opposite to the third main surface 21. The second layer 20 also includes the second through-hole 25 penetrating through the fourth main surface 22 from the third main surface 21. Further, the third main surface 21 includes the third main surface opening 21a defining an end portion of the second through-hole 25 and the third main surface flat portion 21b. The fourth main surface 22 also includes the fourth main surface opening 22a defining another end portion of the second through-hole 25 and the fourth main surface flat portion 22b.

The third layer 60 includes the fifth main surface 61 facing the fourth main surface 22 and the sixth main surface 62 opposite to the fifth main surface 61.

The second main surface opening 12a has an opening area smaller than the opening area of the third main surface opening 21a.

In the sound-absorbing member 700, the first layer 10 and the second layer 20 are partially adhered to each other by the adhesive layer 40.

The second through-hole 25 defines the lateral side of the hollow portion 30, and the fifth main surface 61 defines the bottom 31 of the hollow portion 30.

The second layer 20 and the third layer 60 are stacked as the fourth main surface flat portion 22 and the fifth main surface are partially adhered to each other by the adhesive layer 40.

The first air layer 50 is formed between the second main surface flat portion 12b and the third main surface flat portion 21b.

The first air layer 50 is connected to the hollow portion 30.

The formation of the first air layer 50 improves the sound absorption coefficient by the spring-mass effect.

Further, a second air layer 70 is formed between the fourth main surface flat portion 22 and the fifth main surface 61.

The second air layer 70 is connected to the hollow portion 30.

The formation of the first air layer 70 improves the sound absorption coefficient by the spring-mass effect.

The sound-absorbing member of the present invention may have a structure as shown in FIG. 8.

Specifically, a sound-absorbing member 800 which is an example of the sound-absorbing member of the present invention includes the first layer 10, the second layer 20, and the third layer 60 which are sequentially stacked.

The first layer 10 includes the first main surface 11 and the second main surface 12 opposite to the first main surface 11. The first layer 10 also includes the first through-hole 15 penetrating through the second main surface 12 from the first main surface 11 and defining an inlet passage. Further, the second main surface 12 includes the second main surface opening 12a defining an end portion of the first through-hole 15 and the second main surface flat portion 12b.

The second layer 20 includes the third main surface 21 facing the second main surface 12 and the fourth main surface 22 opposite to the third main surface 21. The second layer 20 also includes the second through-hole 25 penetrating through the fourth main surface 22 from the third main surface 21. Further, the third main surface 21 includes the third main surface opening 21a defining an end portion of the second through-hole 25 and the third main surface flat portion 21b. The fourth main surface 22 also includes the fourth main surface opening 22a defining another end portion of the second through-hole 25, and the fourth main surface flat portion 22b.

The third layer 60 includes the fifth main surface 61 facing the fourth main surface 22 and the sixth main surface 62 opposite to the fifth main surface 61.

The second main surface opening 12a has an opening area smaller than the opening area of the third main surface opening 21a.

The second through-hole 25 defines the lateral side of the hollow portion 30, and the fifth main surface 61 defines the bottom 31 of the hollow portion 30.

In the sound-absorbing member 800, the second main surface flat portion 12b includes the male member 12α and the third main surface flat portion 21b includes the female member 21β. These members are engaged together to connect the first layer 10 to the second layer 20.

The second main surface flat portion 12b and the third main surface flat portion 21b are not in contact with each other except at the male member 12α and the female member 21β, and the first air layer 50 is formed between the second main surface flat portion 12b and the third main surface flat portion 21b.

In the sound-absorbing member 800, the fourth main surface flat portion 22b includes a female member 22β, and the fifth main surface a male member 61α. These members are engaged together to connect the second layer 20 to the third layer 60.

The fourth main surface flat portion 22b and the fifth main surface 61 are not in contact with each other except at the female member 22β and the male member 61α, and the second air layer 70 is formed between the fourth main surface flat portion 22b and the fifth main surface 61.

The second air layer 70 is connected to the hollow portion 30.

The formation of the first air layer 70 improves the sound absorption coefficient by the spring-mass effect.

The sound-absorbing member of the present invention may have a structure as shown in FIG. 9.

Specifically, a sound-absorbing member 900 which is an example of the sound-absorbing member of the present invention includes the first layer 10, the second layer 20, and the third layer 60 which are sequentially stacked.

The first layer 10 includes the first main surface 11 and the second main surface 12 opposite to the first main surface 11. The first layer 10 also includes the first through-hole 15 penetrating through the second main surface 12 from the first main surface 11 and defining an inlet passage. Further, the second main surface 12 includes the second main surface opening 12a defining an end portion of the first through-hole 15 and the second main surface flat portion 12b.

The second layer 20 includes the third main surface 21 facing the second main surface 12 and the fourth main surface 22 opposite to the third main surface 21. The second layer 20 also includes the second through-hole 25 penetrating through the fourth main surface 22 from the third main surface 21. Further, the third main surface 21 includes the third main surface opening 21a defining an end portion of the second through-hole 25 and the third main surface flat portion 21b. The fourth main surface 22 also includes the fourth main surface opening 22a defining another end portion of the second through-hole 25 and the fourth main surface flat portion 22b.

The third layer 60 includes the fifth main surface 61 facing the fourth main surface 22 and the sixth main surface 62 opposite to the fifth main surface 61.

The second main surface opening 12a has an opening area smaller than the opening area of the third main surface opening 21a.

The second through-hole 25 defines the lateral side of the hollow portion 30, and the fifth main surface 61 defines the bottom 31 of the hollow portion 30.

In the sound-absorbing member 900, the second main surface flat portion 12b and the third main surface flat portion 21b are adhered to each other at the edges by an adhesive.

The first layer 10 is curved in a convex shape, and the first air layer 50 is formed between the second main surface flat portion 12b and the third main surface flat portion 21b.

In other words, the first layer 10 is curved such that the second main surface flat portion 12b is convex.

The first air layer 50 is connected to the hollow portion 30.

The formation of the first air layer 50 improves the sound absorption coefficient by the spring-mass effect.

In the sound-absorbing member 900, the fourth main surface flat portion 22b and the fifth main surface 61 are adhered to each other at the edges by an adhesive.

The third layer 60 is curved in a concave shape, and the second air layer 70 is formed between the fourth main surface flat portion 22b and the fifth main surface 61.

In other words, the third layer 60 is curved such that the fifth main surface 61 is concave.

The second air layer 70 is connected to the hollow portion 30.

The formation of the first air layer 70 improves the sound absorption coefficient by the spring-mass effect.

Subsequently, a method of producing a sound-absorbing member including three layers is described.

A method of producing the sound-absorbing member of the present invention includes:

producing an upper layer that is a board including a pillar-shaped first through-hole that defines an inlet passage;

producing a second layer that is a board including a second through-hole;

preparing a board that serves as a third layer;

stacking the first layer and the second layer in such a manner that a first air layer is formed between a second main surface flat portion of the first layer and a third main surface flat portion of the second layer; and stacking the second layer and the third layer in such a manner that a hollow portion is formed.

(Producing First Layer)

A board having a predetermined thickness is prepared. The sheet is made from a material such as resin that can be used as a board.

The first layer can be produced by forming a first through-hole in the sheet by means such as punching, drilling, or lasing.

When a foamed resin formed from foamable resin particles (beads) is used as the board, the first layer including the first through-hole in the board can also be produced by providing a protrusion for forming the first through-hole in a mold and foaming the foamable resin particles.

When the first layer and the second layer are stacked without forming an adhesive layer in the step of stacking the first layer and the second layer (described later), an engaging portion (a male member or a female member) may be formed on the second main surface flat portion of the first layer.

(Producing Second Layer)

A sheet having a predetermined thickness is prepared. The sheet is made from a material such as resin that can be used as a board.

The second through-hole is formed in a board by means such as punching, drilling, or lasing, whereby the second layer can be produced. The second through-hole is made to have a larger diameter than the first through-hole.

When a foamed resin formed from foamable resin particles (beads) is used as the board, the second layer including the second through-hole in the board can also be produced by providing a protrusion for forming the second through-hole in a mold and foaming the foamable resin particles.

When an adhesive layer is not used in the step of stacking the first layer and the second layer (described later), an engaging portion (a male member or a female member) may be formed on the third main surface flat portion of the second layer.

Alternatively, an engaging portion (a male member or a female member) may be formed on the fourth main surface flat portion of the second layer in the step of stacking the second layer and the third layer (described later).

(Preparing Board that Serves as Third Layer)

A board having a predetermined thickness is prepared using a material such as resin that can be used as a board.

When an adhesive layer is not formed in the step of stacking the second layer and the third layer (described later), an engaging portion (a male member or a female member) may be formed on the fifth main surface.

(Stacking First Layer and Second Layer)

Next, when adhering the first layer to the second layer by an adhesive, an adhesive in the form of a sheet is cut into the shape of the second through-hole in the second layer at a position corresponding to the position of the second through-hole. Here, the adhesive is formed into an adhesive layer in the form of a sheet such that the first air layer is formed between the second main surface flat portion of the first layer and the third main surface flat portion of the second layer.

The adhesive is sandwiched between the first layer and the second layer to exhibit its adhesive force therebetween, whereby the first layer and the second layer can be adhered to each other by the adhesive layer.

When stacking the first layer, the adhesive layer, and the second layer, the positions of the first through-hole in the first layer and the second through-hole in the second layer are aligned to form a Helmholtz resonance structure.

The adhesive is applied according to the shape and position of the second through-hole in the second layer, and the first layer and the second layer are stacked to allow the adhesive to exhibit its adhesive force, whereby the first layer and the second layer can be adhered to each other by the adhesive layer.

Conditions to allow the adhesive to exhibit its adhesive force may be adjusted according to adhesive characteristics of the adhesive.

When connecting the first layer to the second layer by the engaging portions, the engaging portions on the first layer and the second layer are engaged together to connect the first layer to the second layer.

(Stacking Second Layer and Third Layer)

Next, when adhering the second layer to the third layer by an adhesive, an adhesive in the form of a sheet is cut into the shape of the second through-hole in the second layer at a position corresponding to a position of the second through-hole. Here, the adhesive may be formed into an adhesive layer in the form of a sheet such that the second air layer is formed between the fourth main surface flat portion of the second layer and the fifth main surface of the third layer.

The adhesive is sandwiched between the second layer and the third layer to exhibit its adhesive force therebetween, and the second layer and the third layer can thus be adhered to each other by the adhesive layer, whereby the hollow portion can be formed.

When connecting the second layer to the third layer by the engaging portions, the engaging portions on the second layer and the third layer are engaged together to connect the second layer to the third layer.

The vehicle component of the present invention includes the sound-absorbing member of the present invention.

The sound-absorbing member of the present invention has excellent sound absorption performance, and is thus excellent as a vehicle component.

Examples of the vehicle component including the sound-absorbing member of the present invention include floor level raising materials, partition members, and luggage boxes.

The automobile of the present invention includes the sound-absorbing member of the present invention with the inlet passage oriented facing a road.

The sound-absorbing member of the present invention disposed in such an orientation can absorb tire pattern noise transferred from the road, and prevent transfer of noise to the vehicle interior.

The sound-absorbing member of the present invention is intended to be used as a vehicle component.

An example in which the sound-absorbing member of the present invention is used as vehicle component and an example of an automobile including the sound-absorbing member of the present invention are described with reference to FIG. 10A and FIG. 10B.

Figure 10A:
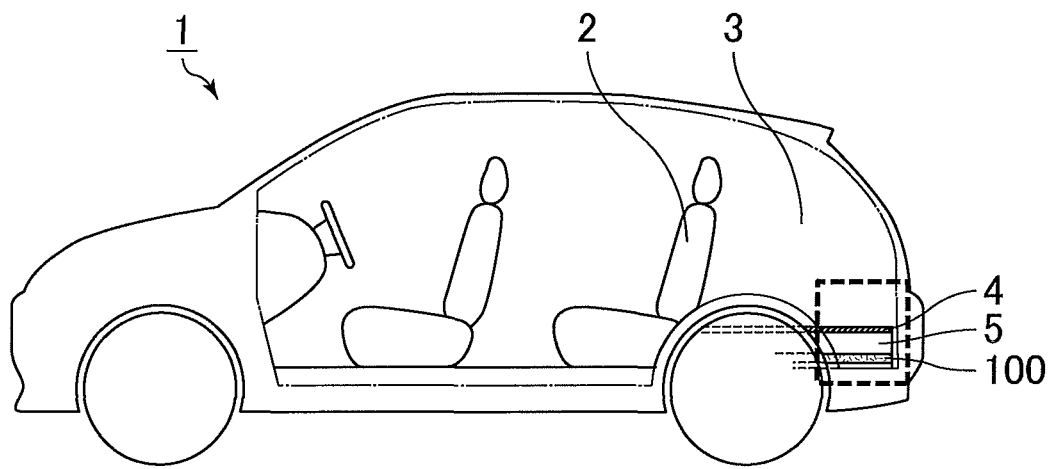
FIG. 10A is a schematic illustration of an exemplary position where the sound-absorbing member of the present invention is arranged.
Figure 10B:
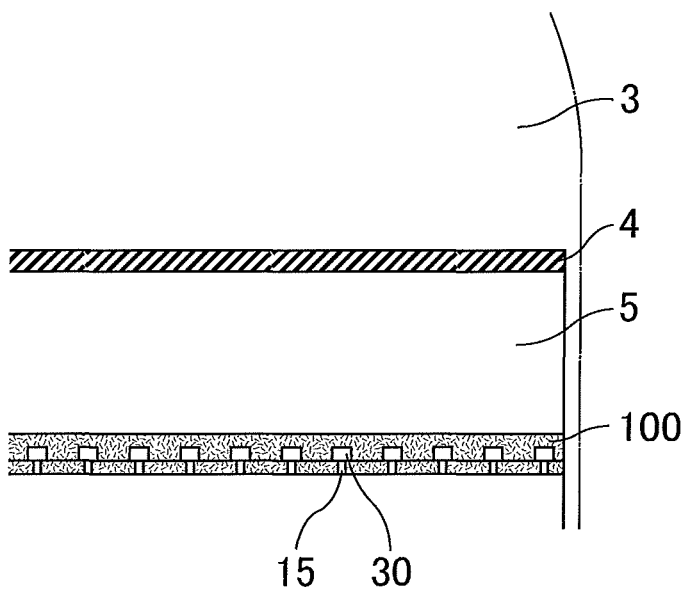
FIG. 10B is an enlarged view of a region in the dotted box in FIG. 10A.

FIG. 10A is a schematic illustration of an exemplary position where the sound-absorbing member of the present invention is arranged. FIG. 10B is an enlarged view of a region in the dotted box in FIG. 10A.

As shown in FIG. 10A, an automobile 1 includes a back seat 2 and a luggage compartment 3 behind the back seat. A plate-like floor member 4 is laid on the bottom of the luggage compartment 3, and an underfloor space 5 is present below the floor member 4.

The sound-absorbing member 100 is disposed below the underfloor space 5 of the automobile 1 such that its inlet passage 15 faces the road.

EXAMPLES

Specific examples that more specifically describe the present invention are provided below, but the present invention is not limited to these examples.

Example 1

(1) Production of Board
(1-1) Production of Board that Serves as First Layer

A mold was filled with primary foamed particles obtained by foaming foamable resin particles in advance (made of polypropylene; average particle size: 3.5 mm; blowing agent: carbon dioxide) and subjected to foam molding with heating steam (143° C., 10 seconds). Then, the molded product was removed from the mold, and dried at 80° C. for 12 hours, whereby a board as a first layer was produced. The first layer was made of a foamed resin and had a size of 800 mm (length)×800 mm (width)×10 mm (thickness), and an engaging portion as a male member was formed at an edge of one of the main surfaces of the first layer. Here, the foamed resin had an expansion ratio of 30 times.

(1-2) Production of Board that Serves as Second Layer

A mold was filled with primary foamed particles obtained by foaming foamable resin particles in advance (made of polypropylene; average particle size: 3.5 mm; blowing agent: carbon dioxide) and subjected to foam molding with heating steam (143° C., 10 seconds). Then, the molded product was removed from the mold, and dried at 80° C. for 12 hours, whereby a board as a second layer was produced. The second layer was made of a foamed resin and had a size of 800 mm (length)×800 mm (width)×10 mm (thickness), and an engaging portion as a female member was formed at an edge of each of the main surfaces of the second layer. Here, the foamed resin had an expansion ratio of 30 times.

(1-3) Production of Board that Serves as Third Layer

A mold was filled with primary foamed particles obtained by foaming foamable resin particles in advance (made of polypropylene; average particle size: 3.5 mm; blowing agent: carbon dioxide) and subjected to foam molding with heating steam (143° C., 10 seconds). Then, the molded product was removed from the mold, and dried at 80° C. for 12 hours, whereby a board (a third layer) was produced. The third layer was made of a foamed resin and had a size of 800 mm (length)×800 mm (width)×10 mm (thickness), and an engaging portion as a male member was formed at an edge of one of the main surfaces of the third layer. Here, the foamed resin had an expansion ratio of 30 times.

(2) Formation of Through-hole

Through-holes (first through-holes) in the shape of circles each having a diameter of 3 mm were formed in a zigzag arrangement with a hole pitch of 10 mm in the sheet as the first layer produced in (1-1) above, whereby a first layer was produced.

Through-holes (second through-holes) in the shape of circles each having a diameter of 10 mm were formed in a zigzag arrangement with a hole pitch of 10 mm in the sheet as the second layer produced in (1-2) above, whereby a second layer was produced.

(3) Stacking and Adhering

An adhesive (Bond G Clear available from Konishi Co., Ltd.) was applied to the engaging portions of the first layer, the second layer, and the third layer to stack the first layer, the second layer, and the third layer. Thus, a first air layer was formed between a second main surface flat portion and a third main surface flat portion except for the engaging portions, and a second air layer was formed between a fourth main surface flat portion and a fifth main surface except for the engaging portions.

Thus, a sound-absorbing member according to Example 1 having a structure shown in FIG. 8 was produced.

In the sound-absorbing member according to Example 1, the distance between the second main surface flat portion and the third main surface flat portion was 100 μm, and the distance between the fourth main surface flat portion and the fifth main surface was 100 μm.

Example 2

(1) Production of Board

A mold was filled with primary foamed particles obtained by foaming foamable resin particles in advance (made of polypropylene; average particle size: 3.5 mm; blowing agent: carbon dioxide) and subjected to foam molding with heating steam (143° C., 10 seconds). Then, the molded product was removed from the mold, and dried at 80° C. for 12 hours, whereby three boards were produced. Each sheet was made of a foamed resin and had a size of 800 mm (length)×800 mm (width)×10 mm (thickness). Here, the foamed resin had an expansion ratio of 30 times.

(2) Formation of Through-Hole

Through-holes (first through-holes) in the shape of circles each having a diameter of 3 mm were formed in a zigzag arrangement with a hole pitch of 10 mm in one of the sheets produced in (1) above, whereby a first layer was produced.

Subsequently, through-holes (second through-holes) in the shape of circles each having a diameter of 10 mm were formed in a zigzag arrangement with a hole pitch of 10 mm in another board produced in (1) above, whereby a second layer was produced.

The remaining sheet produced in (1) above was used as a third layer without through-holes.

(3) Stacking and Adhering

An adhesive (Bond G Clear available from Konishi Co., Ltd.; application thickness: 100 μm) was applied to the third main surface flat portion of the second layer except for a certain predetermined region around a third main surface opening of the second layer.

Here, the adhesive was applied such that the ratio between the area of the region to which the adhesive was applied and the area of the region to which the adhesive was not applied was 1:1 in the third main surface flat portion.

Subsequently, the first layer and the second layer were adhered to each other such that the center of the first through-hole formed in the first layer was coincident with the center of the second through-hole formed in the second layer. Thus, the first air layer was formed in a space between the second main surface flat portion of the first layer and the third main surface flat portion of the second layer, where the adhesive was not applied.

Subsequently, an adhesive (Bond G Clear available from Konishi Co., Ltd.; application thickness: 100 μm) was applied to the fourth main surface flat portion of the second layer except for a certain predetermined region around a fourth main surface opening of the second layer.

Here, the adhesive was applied such that the ratio between the area of the region to which the adhesive was applied and the area of the region to which the adhesive was not applied was 1:1 in the fourth main surface flat portion.

Subsequently, the second layer and the third layer were adhered to each other. Thus, a second air layer was formed in a space between the fourth main surface flat portion of the second layer where the adhesive was not applied and the fifth main surface of the third layer.

Thus, a sound-absorbing member according to Example 2 having a structure shown in FIG. 7 was produced.

In the sound-absorbing member according to Example 2, the distance between the second main surface flat portion and the third main surface flat portion was 100 μm, and the distance between the fourth main surface flat portion and the fifth main surface was 100 μm.

Comparative Example 1

A sound-absorbing member according to Comparative Example 1 was produced as in Example 2, except that the adhesive was applied to the entire surfaces of the third main surface flat portion and the fourth main surface flat portion of the second layer and that the first layer, the second layer, and the third layer were stacked in "(3) Stacking and adhering" in the method of producing the sound-absorbing member according to Example 2.
(Experiments for Measurement of Sound Absorption Frequency and Measurement of Sound Absorption Coefficient)

The sound-absorbing members according to Examples 1 and 2 and Comparative Example 1 were subjected to measurement of the sound absorption frequency and the sound absorption coefficient under various frequencies.

The sound absorption coefficient was measured by a test for sound absorption coefficient in a reverberation room. The measurement was performed in accordance with JIS A 1409: 1998 "Method for measurement of sound absorption coefficients in a reverberation room".

Figure 11:
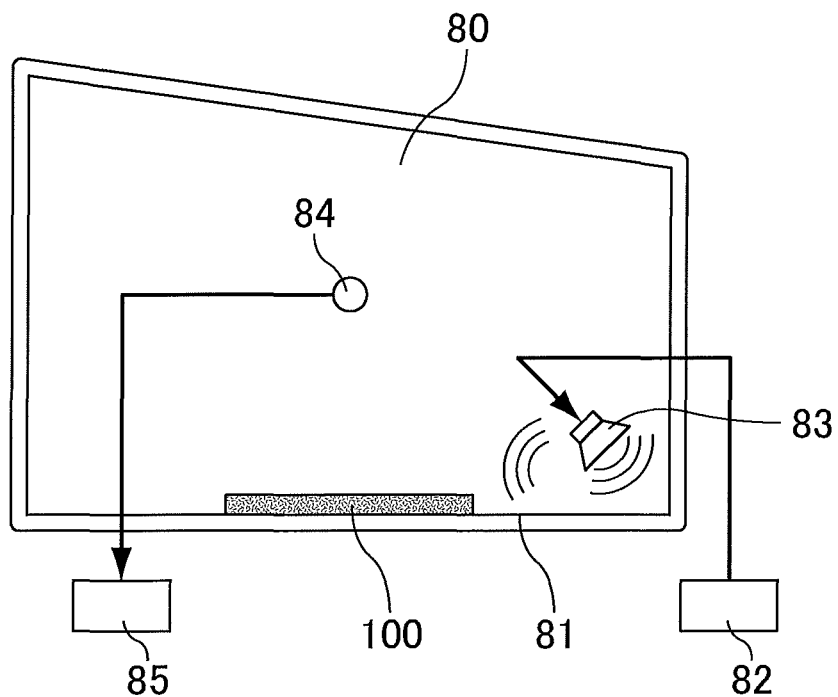
FIG. 11 is a schematic illustration of test for sound absorption coefficient of a sound-absorbing member in a reverberation room.

FIG. 11 is a schematic illustration of test for sound absorption coefficient of a sound-absorbing member in a reverberation room.

As shown in FIG. 11, when measuring the sound absorption coefficient, the sound-absorbing member 100 according to each of the examples and the comparative example is placed on a floor 81 of a reverberation room 80, with the opening of the inlet passage facing up, and electrical noise is emitted through a speaker 83 from a noise signal generator 82 in the reverberation room 80. Then, the sound emission is stopped, and the sound is measured by a microphone 84, and the decay process is analyzed by a signal analyzer 85. Reverberation time T1 (sec.) and reverberation time T2 (sec.) are measured. Reverberation time T1 (sec.) is a time required for sound to decay 60 dB from the decay curve analyzed before a specimen was placed, and reverberation time T2 (sec.) is a time required for sound to decay 60 dB from the decay curve measured after the specimen was placed on the floor. The measurement is performed at 300 to 5000 Hz.

Figure 12:
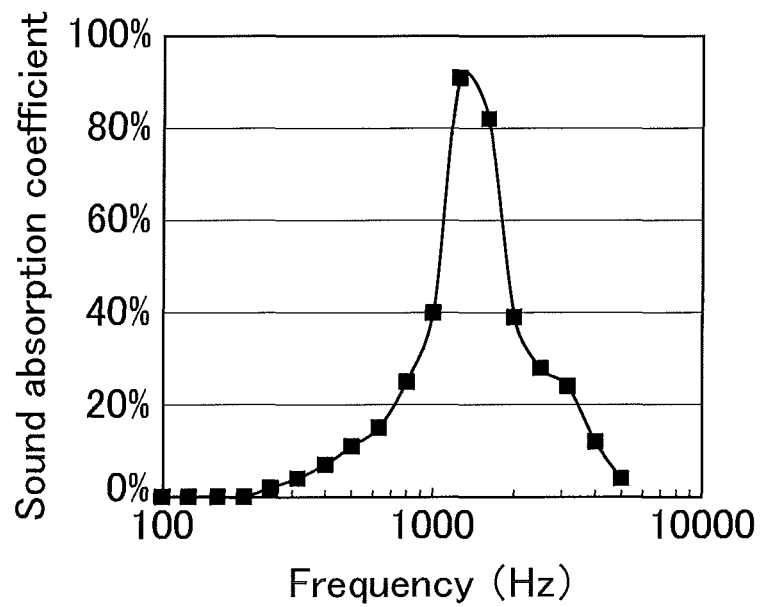
FIG. 12 is a graph showing results of a test for sound absorption coefficient of a sound-absorbing member according to Example 1 of the present invention in a reverberation room.
Figure 13:
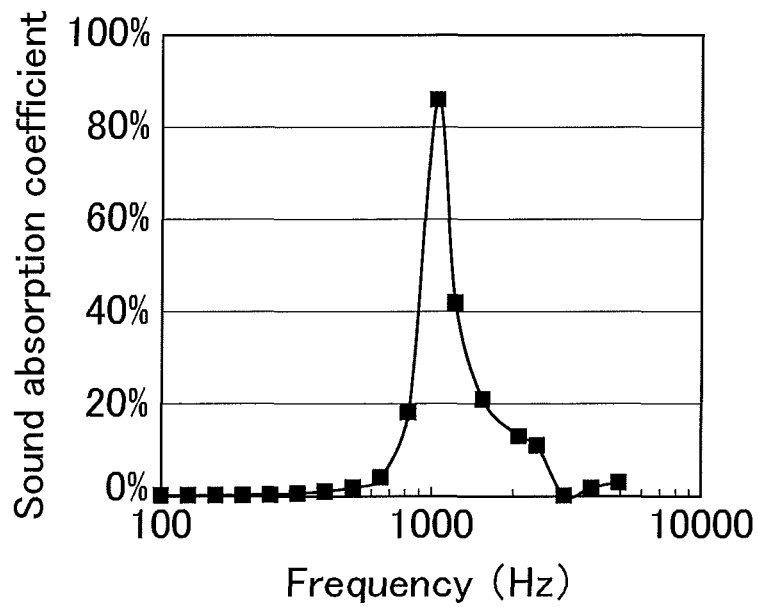
FIG. 13 is a graph showing results of a test for sound absorption coefficient of a sound-absorbing member according to Example 2 of the present invention in a reverberation room.
Figure 14:
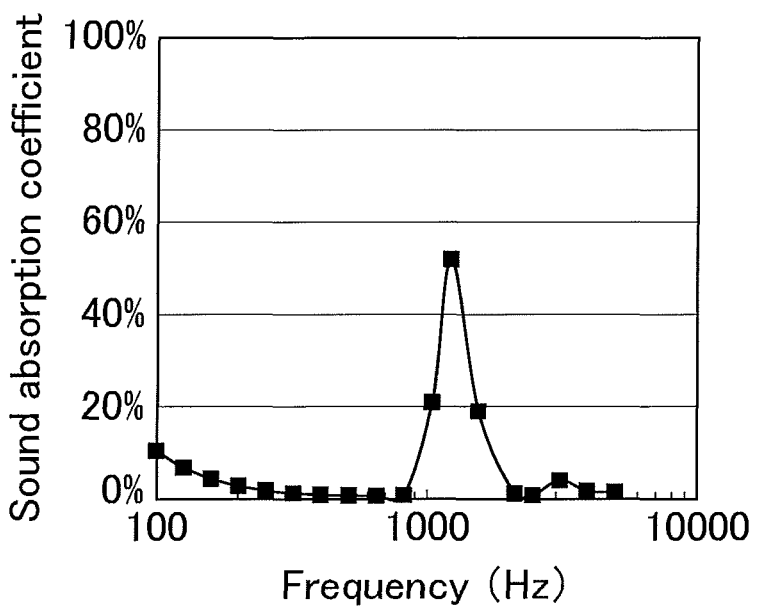
FIG. 14 is a graph showing results of a test for sound absorption coefficient of a sound-absorbing member according to Comparative Example 1 of the present invention in a reverberation room.

FIG. 12, FIG. 13, and FIG. 14 each show a graph of results of the test for sound absorption coefficient test in a reverberation room.

FIG. 12 is a graph showing results of the test for sound absorption coefficient of the sound-absorbing member according to Example 1 of the present invention in the reverberation room.

FIG. 13 is a graph showing results of the test for sound absorption coefficient of the sound-absorbing member according to Example 2 of the present invention in the reverberation room.

FIG. 14 is a graph showing results of the test for sound absorption coefficient of the sound-absorbing member according to Comparative Example 1 of the present invention in the reverberation room.

As shown in FIG. 12, FIG. 13, and FIG. 14, the sound-absorbing members according to Examples 1 and 2 exhibited high sound absorption performance. In particular, the peak of the sound absorption coefficient was high.

REFERENCE SIGNS LIST

1 automobile
2 back seat
3 luggage compartment
4 floor member
5 underfloor space
10 first layer
11 first main surface
12 second main surface
12*a* second main surface opening
12*b* second main surface flat portion
12α, 61α male member
15 first through-hole
20 second layer
21 third main surface
21*a* third main surface opening
21*b* third main surface flat portion
21β, 22β female member
22 fourth main surface
22*a* fourth main surface opening
22*b* fourth main surface flat portion
25 second through-hole
30 hollow portion
30*a* blind hole
31 bottom
40 adhesive layer
50 first air layer
60 third layer
61 fifth main surface
62 sixth main surface
70 second air layer
80 reverberation room
81 floor
82 noise signal generator
83 speaker 84 microphone
85 signal analyzer
100, 200, 300, 400, 500, 600, 700, 800, 900 sound-absorbing member

The invention claimed is:

1. A sound-absorbing member comprising
a Helmholtz resonance structure including an inlet passage and a hollow portion connected to the outside through the inlet passage,
wherein the sound-absorbing member includes a first layer and a second layer disposed on the first layer,
the first layer includes a first main surface and a second main surface opposite to the first main surface,
the second layer includes a third main surface facing the second main surface and a fourth main surface opposite to the third main surface,
the first layer includes a first through-hole penetrating through the second main surface from the first main surface and defining the inlet passage,
the second main surface includes a second main surface opening defining an end portion of the first through-hole and a second main surface flat portion,
the third main surface includes a third main surface opening defining an end portion of the hollow portion and a third main surface flat portion,
the second main surface opening has an opening area smaller than the opening area of the third main surface opening,
a first air layer is formed at least at a portion between the second main surface flat portion and the third main surface flat portion,
a third layer including a fifth main surface facing the fourth main surface and a sixth main surface opposite to the fifth main surface is disposed below the second layer,
the second layer includes a second through-hole penetrating through the fourth main surface from the third main surface and defining a lateral side of the hollow portion, and
the fifth main surface defines a bottom of the hollow portion.

2. The sound-absorbing member according to claim 1, wherein the second main surface flat portion and the third main surface flat portion are partially in contact with each other.

3. The sound-absorbing member according to claim 1, wherein at least one of the second main surface flat portion or the third main surface flat portion is curved or wavy, and the second main surface flat portion and the third main surface flat portion are partially in contact with each other.

4. The sound-absorbing member according to claim 1, wherein the fourth main surface includes a fourth main surface opening defining an end portion of the second through-hole and a fourth main surface flat portion, and
a second air layer is formed at least at a portion between the fourth main surface flat portion and the fifth main surface.

5. The sound-absorbing member according to claim 4, wherein the fourth main surface flat portion and the fifth main surface are partially in contact with each other.

6. The sound-absorbing member according to claim 4, wherein at least one of the fourth main surface flat portion or the fifth main surface is curved or wavy, and the fourth main surface flat portion and the fifth main surface are partially in contact with each other.

7. The sound-absorbing member according to claim 1, wherein the first main surface includes a first main surface opening defining an end portion of the first through-hole and a first main surface flat portion, and
a fiber layer is disposed on the first main surface flat portion.

8. The sound-absorbing member according to claim 1, wherein the sound-absorbing member is made of resin and/or a fibrous material.

9. The sound-absorbing member according to claim 8, wherein the resin is a foamed resin.

10. A vehicle component comprising:
the sound-absorbing member according to claim 1.

11. An automobile comprising:
the sound-absorbing member according to claim 1 with the inlet passage oriented facing a road.

* * * * *